(12) United States Patent
Zhou

(10) Patent No.: US 10,389,766 B2
(45) Date of Patent: Aug. 20, 2019

(54) METHOD AND SYSTEM FOR INFORMATION SHARING

(71) Applicant: TECHEXCEL INC., Lafayette, CA (US)

(72) Inventor: Tieren Zhou, Orinda, CA (US)

(73) Assignee: TECHEXCEL INC., Lafayette, CA (US)

(*) Notice: Subject to any disclaimer, the term of this patent is extended or adjusted under 35 U.S.C. 154(b) by 35 days.

(21) Appl. No.: 13/691,901

(22) Filed: Dec. 3, 2012

(65) Prior Publication Data

US 2013/0159414 A1 Jun. 20, 2013

Related U.S. Application Data

(60) Provisional application No. 61/576,389, filed on Dec. 16, 2011.

(51) Int. Cl.
*H04L 29/06* (2006.01)

(52) U.S. Cl.
CPC ........ *H04L 65/403* (2013.01); *H04L 65/4084* (2013.01)

(58) Field of Classification Search
CPC ... G06Q 10/10; H04L 29/06; H04L 29/08072; H04L 29/06027; H04L 12/581
USPC .................................. 709/204, 206
See application file for complete search history.

(56) References Cited

U.S. PATENT DOCUMENTS

| | | | | |
|---|---|---|---|---|
| 7,714,222 | B2* | 5/2010 | Taub et al. | 84/600 |
| 7,933,952 | B2* | 4/2011 | Parker et al. | 709/204 |
| 8,434,002 | B1* | 4/2013 | Shah et al. | 715/255 |
| 8,438,504 | B2* | 5/2013 | Cranfill | G06F 3/0481 715/702 |
| 8,552,281 | B1* | 10/2013 | Cotrone | 84/477 R |
| 8,612,380 | B2* | 12/2013 | Kleppner et al. | 707/608 |

(Continued)

FOREIGN PATENT DOCUMENTS

WO  WO2008101126 A1  8/2008

OTHER PUBLICATIONS

Roseman, Mark, and Saul Greenberg. "GroupKit: A groupware toolkit for building real-time conferencing applications." in Proceedings of the 1992 ACM conference on Computer-supported cooperative work, pp. 43-50. ACM, 1992.*

(Continued)

*Primary Examiner* — Suraj M Joshi
*Assistant Examiner* — Melaku Y Habtemariam
(74) *Attorney, Agent, or Firm* — West & Associates, APC; Stuart J. West

(57) ABSTRACT

Method, system, and programs for information sharing are provided. A first request from a user to access a first piece of information is received. As a response to the first request, a first representation of the first piece of information is retrieved. The first piece of information is made accessible to the user. A second request is received from the user to generate a second piece of information based on the first piece of information. The second piece of information is generated based on an input received from the user. A second representation is created for the second piece of information. The second representation and the first representation are marked as associated with each other so that whenever the first piece of information is accessed in the future, the second piece of information is made available.

35 Claims, 21 Drawing Sheets

(56) References Cited

U.S. PATENT DOCUMENTS

| | | | |
|---|---|---|---|
| 8,782,145 B2 | 7/2014 | Cherukuri | |
| 2001/0048484 A1* | 12/2001 | Tamir | H04N 5/272 348/589 |
| 2002/0010707 A1* | 1/2002 | Chang | G06F 17/211 715/205 |
| 2002/0106623 A1* | 8/2002 | Moehrle | G09B 23/28 434/365 |
| 2004/0125123 A1 | 7/2004 | Vasudevan | |
| 2005/0120127 A1* | 6/2005 | Bradley | G11B 27/11 709/231 |
| 2008/0126943 A1* | 5/2008 | Parasnis et al. | 715/730 |
| 2009/0083637 A1* | 3/2009 | Skakkebaek et al. | 715/751 |
| 2009/0133081 A1 | 5/2009 | Sakai et al. | |
| 2010/0070600 A1* | 3/2010 | Schulzrinne et al. | 709/206 |
| 2011/0185025 A1* | 7/2011 | Cherukuri et al. | 709/206 |
| 2011/0270778 A1 | 11/2011 | Mondal | |
| 2012/0158753 A1* | 6/2012 | He | G06F 17/30867 707/752 |
| 2012/0173992 A1* | 7/2012 | D'Angelo et al. | 715/751 |

OTHER PUBLICATIONS

International Search Report corresponding to PCT/US2012/067853 dated Feb. 15, 2013.
International Preliminary Report on Patentability dated Jun. 26, 2014 in International Application No. PCT/US2012/067853.

\* cited by examiner

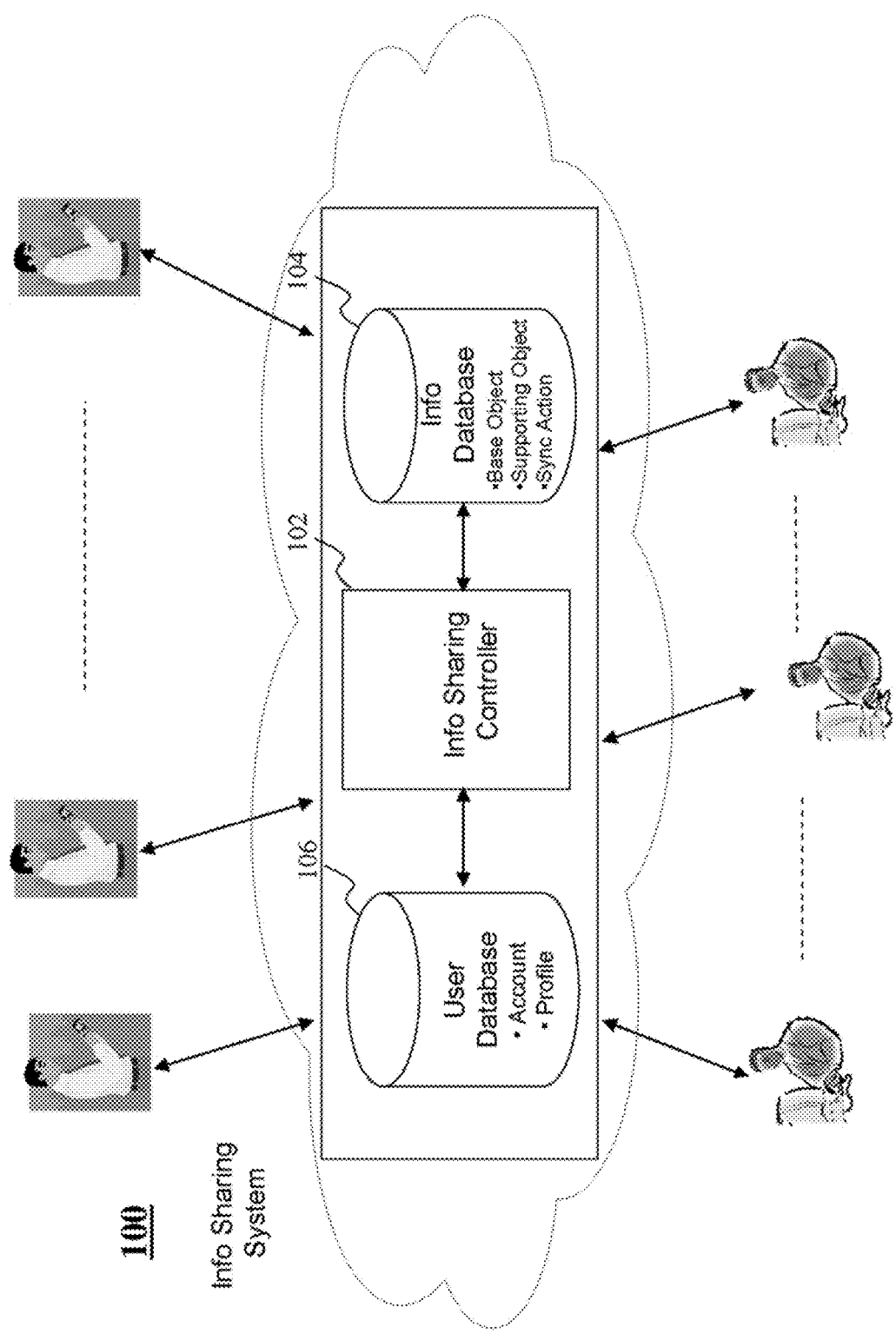

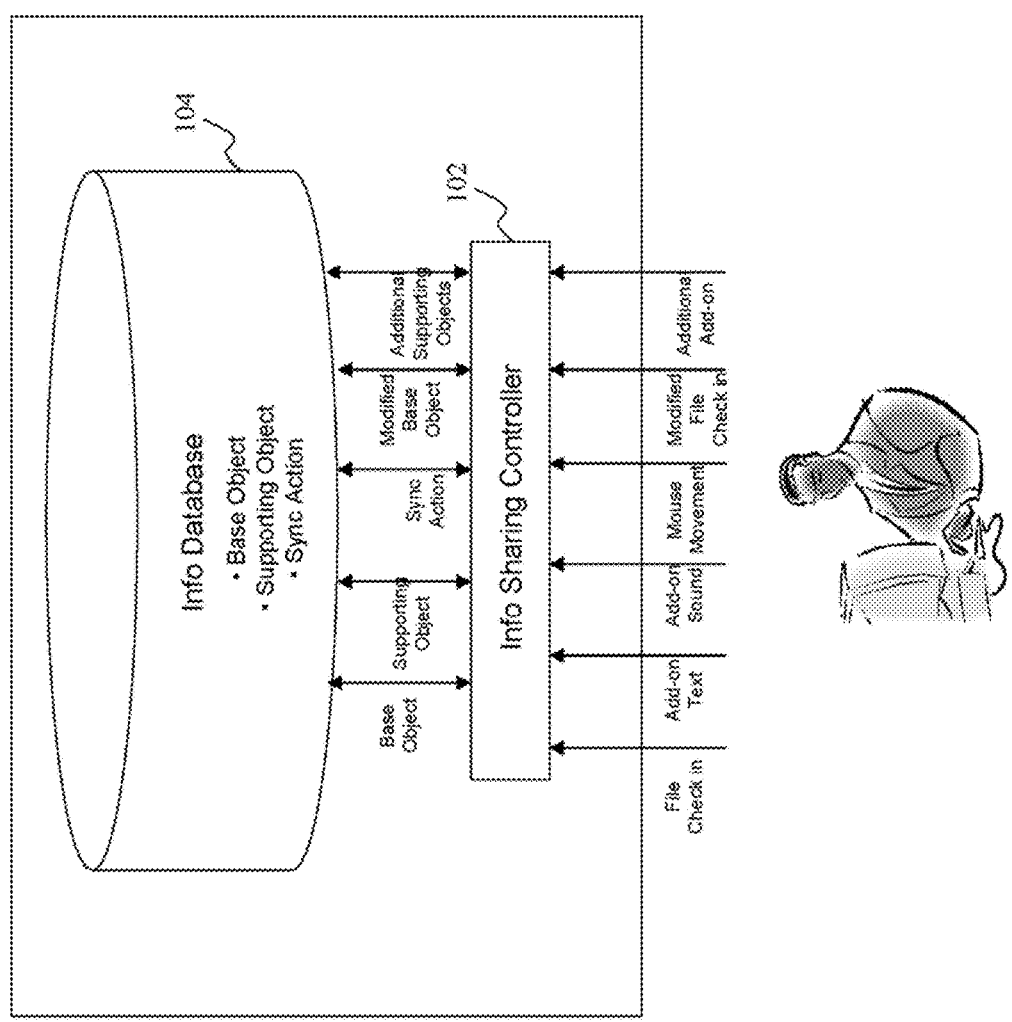

METHOD AND SYSTEM FOR INFORMATION SHARING

CROSS-REFERENCE TO RELATED APPLICATIONS

The present application claims priority to U.S. Provisional Application Ser. No. 61/576,389 filed Dec. 16, 2011 entitled "METHOD AND SYSTEM FOR INFORMATION SHARING," which is incorporated herein by reference in its entirety.

BACKGROUND

1. Technical Field

The present teaching relates to methods, systems, and programming for information sharing. Particularly, the present teaching is directed to methods, systems, and programming for multimedia information sharing through a network.

2. Discussion of Technical Background

Cloud computing service providers deliver applications via the Internet. Such cloud supported applications can be accessed on desktops or mobile devices via, web browsers, while the operational software and data are stored on servers at some remote location(s) in the "cloud" One of the promising application areas in the context of cloud computing is information sharing among different users because the "could" enables a user to access systems or applications via a web browser regardless of the location of or device type the user is using. As the backbone supporting infrastructure is off-site (typically provided by a third-party) and accessed via the Internet, a user can virtually connect to an application from anywhere. Early examples in this area include screen-sharing applications where one person's screen can be encoded video stream and real-time delivered to other persons. In another examples, business applications have been coded entirely using web-based technologies. In still another example, business applications for information sharing are often developed using web-based technologies where information is shared using web browsers.

Traditionally, people share information online through means such as email, instant messenger, message board, desktop sharing, etc., which may not be effective and efficient, especially when multiple parties are involved and when the shared information includes multimedia information. For example, traditional online meeting based on screen-sharing may introduce a significant latency because it requires transferring the desktop information of the presenter in the form of a video stream to each of the participants. Moreover, currently, there is no effective cloud-based platform for multiple users to modify shared information in a simple and straightforward manner and consolidate modifications to the shared information from different users in an intuitive form. Therefore, there is a need to provide a solution for sharing multimedia information with an improved user experience.

SUMMARY

The present teaching relates to methods, systems, and programming for information sharing. Particularly, the present teaching is directed to methods, systems, and programming for multimedia information sharing through a network.

In one example, a method, implemented on at least one machine each having at least one processor, storage, and a communication platform connected to a network for information sharing is presented. A first request from a user to access a first piece of information is received. As a response to the first request, a first representation of the first piece of information is retrieved. The first piece of information is made accessible to the user. A second request is received from the user to generate a second piece of information based on the first piece of information. The second piece of information is generated based on an input received from the user. A second representation is created for the second piece of information. The second representation and the first representation are marked as associated with each other so that whenever the first piece of information is accessed in the future, the second piece of information is made available.

In another example, a method, implemented on at least one machine each having at least one processor, storage, and a communication platform connected to a network for information sharing is presented. A first request from a first user to access a first piece of information is received. As a response to the first request, a first representation of the first piece of information is retrieved. A second representation of a second piece of information created by a second user and associated with the first piece of information is retrieved. A second request is received from the first user to create a third piece of information associated with the second piece of information. The third piece of information is created based on an input from the first user. A third representation is generated for the third piece of information. The third representation includes an indication of association to the second piece of information. A relationship is established between the first and the second users.

In still another example, a method, implemented on at least one machine each having at least one processor, storage, and a communication platform connected to a network for information sharing is presented. A first request is received from a first user to access a first piece of information. As a response to the first request, a first representation of the first piece of information is retrieved. A second representation of a second piece of information created by a second user and associated with the first piece of information is retrieved. The second representation includes a solicitation for a response to the second piece of information. A second request is received from the first user to respond to the solicitation for a response to the second piece of information. The third piece of information is created based on an input from the first user in responding to the second piece of information. A third representation is generated for the third piece of information. The third representation includes an indication of association to the second piece of information. A service relationship is established between the first and the second users.

In yet another example, a method, implemented on at least one machine each having at least one processor, storage, and a communication platform connected to a network for information sharing is presented. A first request to access a first piece of information is received. The first request is associated with a plurality of users. The first piece of information is retrieved as a response to the first request. The first piece of information accessible to the plurality of users is delivered. A second request is received from an acting user to generate a second piece of information based on the first piece of information. The second piece of information is generated based on an input received from the acting user. Information indicating an association between the second piece of information and the first piece of information is created. The second piece of information with embedded information indicating the association is delivered to the plurality of users.

In yet another example, a method, implemented on at least one machine each having at least one processor, storage, and a communication platform connected to a network for information sharing is presented. A first request from a first user is received to access a first piece of information created by a second user. A first representation of the first piece of information is retrieved as a response to the first request. The first representation includes a solicitation from the second user for additional information based on the first piece of information. A second piece of information is created based on an input from the first user in response to the solicitation. A second representation for the second piece of information is generated. The second representation includes an indication of association to the first piece of information. A third piece of information is generated based on the first and second pieces of information. The third piece of information is provided to a third user. Relationships between the third and first users and between the third and second users are established. An account record corresponding to the established relationships is created.

In a different example, a system for information sharing is presented, which includes a base object generator and a supporting object generator. The base object generator is configured to receive a first request from a user to access a first piece of information. The base object generator is also configured to retrieve a first representation of the first piece of information as a response to the first request. The base object generator is further configured to make the first piece of information accessible to the user. The supporting object generator is configured to receive a second request from the user to generate a second piece of information based on the first piece of information. The supporting object generator is also configured to generate the second piece of information based on an input received from the user. The supporting object generator is further configured to create a second representation for the second piece of information. The second representation and the first representation are marked as associated with each other so that whenever the first piece of information is accessed in the future, the second piece of information is made available.

Other concepts relate to software for information sharing. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for information sharing, wherein the information, when read by the machine, causes the machine to perform a series of steps. A first request from a user to access a first piece of information is received. As a response to the first request, a first representation of the first piece of information is retrieved. The first piece of information is made accessible to the user. A second request is received from the user to generate a second piece of information based on the first piece of information. The second piece of information is generated based on an input received from the user. A second representation is created for the second piece of information. The second representation and the first representation are marked as associated with each other so that whenever the first piece of information is accessed in the future, the second piece of information is made available.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a high level exemplary diagram of a system for information sharing, according to an embodiment of the present teaching;

FIGS. 2(a) and 2(b) are more detailed diagrams of the exemplary system for information sharing shown in FIG. 1, according to different embodiments of the present teaching;

DETAILED DESCRIPTION

Figure 2B:
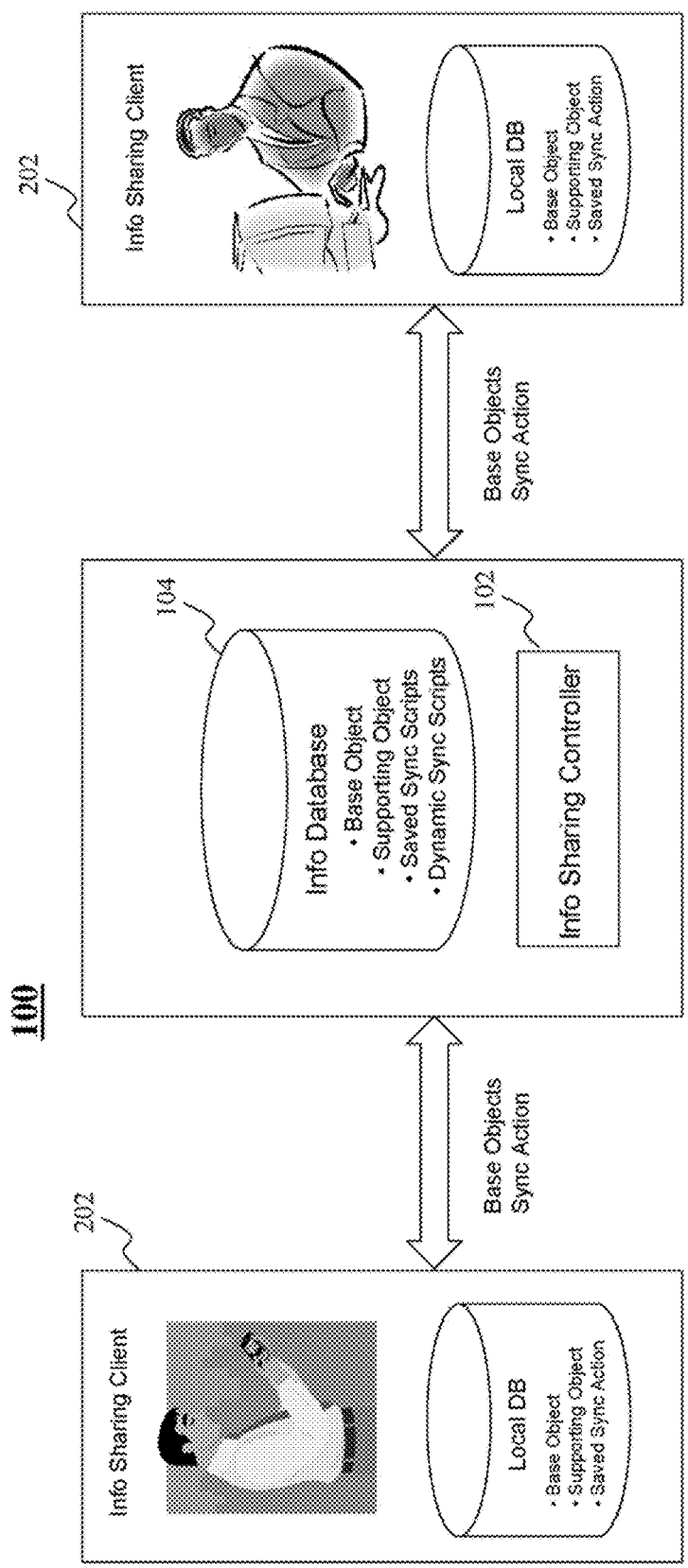

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of multimedia information sharing through a network to enable an effective collaboration among people based on their needs of sharing documents and ideas. Multimedia information needs to be shared not only as web pages by users using web browsers, but also with content delivered to personal computing devices such as smart phones, tablet computers such as IPAD, ANDROID Tablets, etc. Such information is not delivered in a format of video stream but instead, is delivered with synchronized multi-format objects including sound, pictures, documents, actions, etc., which can be modified, mixed, and synchronized with future added additional information objects, in additions, the method and system also provide a real-time meeting capability with minimum latency and better user-experience to further facilitate information sharing among people. As such dynamic multimedia information can be created and saved, for the optimized sharing purpose, it provides at least the following novel features: supporting any types of documents and can be converted to the base objects, having the mechanism for adding additional information such as notes, comment, voice, animation, etc, as the supporting objects, supporting version control, supporting online meeting, and allowing multi-users interactive information sharing.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level exemplary system diagram of a system for information sharing, according to an embodiment of the present teaching. The information sharing system 100 may reside on a "could" computing environment formed by distributed and shared computing resources connected through a set of networks. The networks can be a single network or a combination of different networks. For example, a network can be a local area network (LAN), a wide area network. (WAN), a public network, a private network, a proprietary network, a Public Telephone Switched Network (PSTN), the Internet, a wireless network, a virtual network, or any combination thereof. Users may share information (e.g., documents, ideas, etc.) through the information sharing system 100 residing on the "cloud."

The information sharing system 100 in this example includes an information sharing controller 102, an information database 104, and a user database 106. The information sharing controller 102 is a mechanism for controlling operations of the information sharing system 100 and will be described in detail later. The information database 104 may include one or more databases on one or more servers for providing and storing any information to be shared among users. For example, at least three categories of information are stored in the information database 104: base objects, supporting objects, and synchronizing actions.

The base objects may be converted user files of a certain type that can be accessed by any user via a web browser or an application. For example, the user files may carry on information that the users want to share through information sharing system 100 and include, but are not limited to, text, presentation slide, image, music sheet, spreadsheet, video, portable document format (PDF) file, database file, or any suitable type of file known in the art. The user files may not be directly accessed by different web browsers, operating systems, or applications and thus, may need to be converted to the base objects of a certain type. For example, the base object may be an ADOBE FLASH file, a MICROSOFT SILVERLIGHT file, an HTML5 file, an image file, a video file, a PDF file, or any suitable type of file known in the art.

The supporting objects may be generated based on information provided by the users in view of the base objects and associated with the corresponding base objects. For example, the supporting objects may be comments on the base object provided by the same user or a different user, in the forms of, for example, a text note, a text comment, a highlighting box, an audio comment, etc. Depending on the way in which the supporting objects are associated with the base objects, the supporting objects may include time-based supporting object, such as an audio, a video, an animation, a mouse movement a visual effect, and an application and non-time-based supporting object, such as a text note, a text comment, a highlighting box, a magnifier, a hyperlink, a diagram, an image, and a drawing. The synchronizing actions (actionable items) represent actions which are designed for manipulating the base objects and synchronizing the base objects with the associated supporting objects.

The user database 106 may include one or more databases on one or more servers for providing and storing any information related to the users of the information sharing system 100. The user database 106 may include, for example, user profiles and member accounts. The user profiles may include any suitable information related to the users (e.g., demographic information, geographical information, online activity history, etc.). In one example, the users of the information sharing system 100 may be "members" who have subscribed for the service of the information sharing system 100 and has an associated member account stored in the user database 106. The member account may include records such as annual fees paid to the entity that runs information sharing system 100 and service fees incremented per information service and paid to the entity that runs the information sharing system 100 and/or other members who provide the piece of information (e.g., base objects and/or supporting objects). It is understood that the users may also be "non-members" who can use the information sharing system 100 as guests without subscribing for the service from the information sharing system 100. The member account may also include records such as a time and date when each base object, supporting object, or synchronizing actions is created and modified by the member user.

FIGS. 2(a) and 2(b) are more detailed diagrams of the information sharing system 100 shown in FIG. 1, according to different embodiments of the present teaching. In FIG. 2(a), a user may interact with the information sharing system 100 to provide information in the forms of base objects, supporting objects, synchronizing actions, which he/she would like to share with other users for free or at a price, in this example, the user may first upload a user file, which contains contents to be shared, in any suitable type. The information sharing controller 102 then converts the user file into a base object of a certain type as noted above. The base object is stored in the information database 104. The user then may comment on the base object by providing add-on text. The information sharing controller 102 then generates a supporting object based on the add-on text, in order to associate the supporting object with the base object, the user may further input a synchronizing action to the information sharing system 100. For example, the user may move the mouse cursor on the screen to indicate where the add-on text should be located on the base object. The mouse movement may be recorded as a synchronizing action by the information sharing controller 102 and stored in the information database 104. In this example, the base object itself may also be modified by the user. For example, the user may modify the content of the original user file and upload the modified user file to the information sharing system 100 to replace the previous version of the base object. The information sharing controller 102 then generates the modified base object and stores it in the information database 104. In one example, different versions of the base object may be stored in the information database 104 for version control purpose. The number of supporting objects for a particular base object may not be limited. For example, the user may further provide additional add-on information to the modified base object as the additional supporting objects.

FIG. 2(b) shows building a dynamic information sharing linkage between at least two users through the information sharing system 100. The base objects, supporting objects, and synchronizing actions may be transmitted between the paired users to achieve information sharing. Each user may comment on the other party's shared information by adding supporting objects and synchronizing, actions on the base object. In this example, one or more users may have local information sharing clients 202 each including a local database such that the base objects and supporting objects stored in the information database 104 may be retrieved and stored in the local database. The information sharing client 202 may reside on any suitable device, such as but not limited to, a desktop or laptop computer, a netbook, a tablet, a smart phone, a game console, a set-top box, etc In this example, synchronizing actions may be retrieved and stored in the information sharing client 202 along with the corresponding base and supporting objects. Once a user dynamically manipulates the base object and/or the supporting object through synchronizing actions (e.g., moving a highlighting box to a different location on a WORD document), only the dynamically generated synchronizing actions (e.g., the mouse movement) need to be transmitted to the other user because the manipulated base object and the supporting object have already been retrieved and stored in the local database. As a result, the information sharing between the users is facilitated since the amount of data needs to be transmitted (dynamic synchronizing actions) is minimized. In this example, depending on the type of shared information, a particular service relationship may be established between the paired users through the information sharing system 100. The service relationship includes, for example, teach-student, editor-author, attorney-client, doctor-patient, and collaborators relationships, to name a few.

Figure 3A:
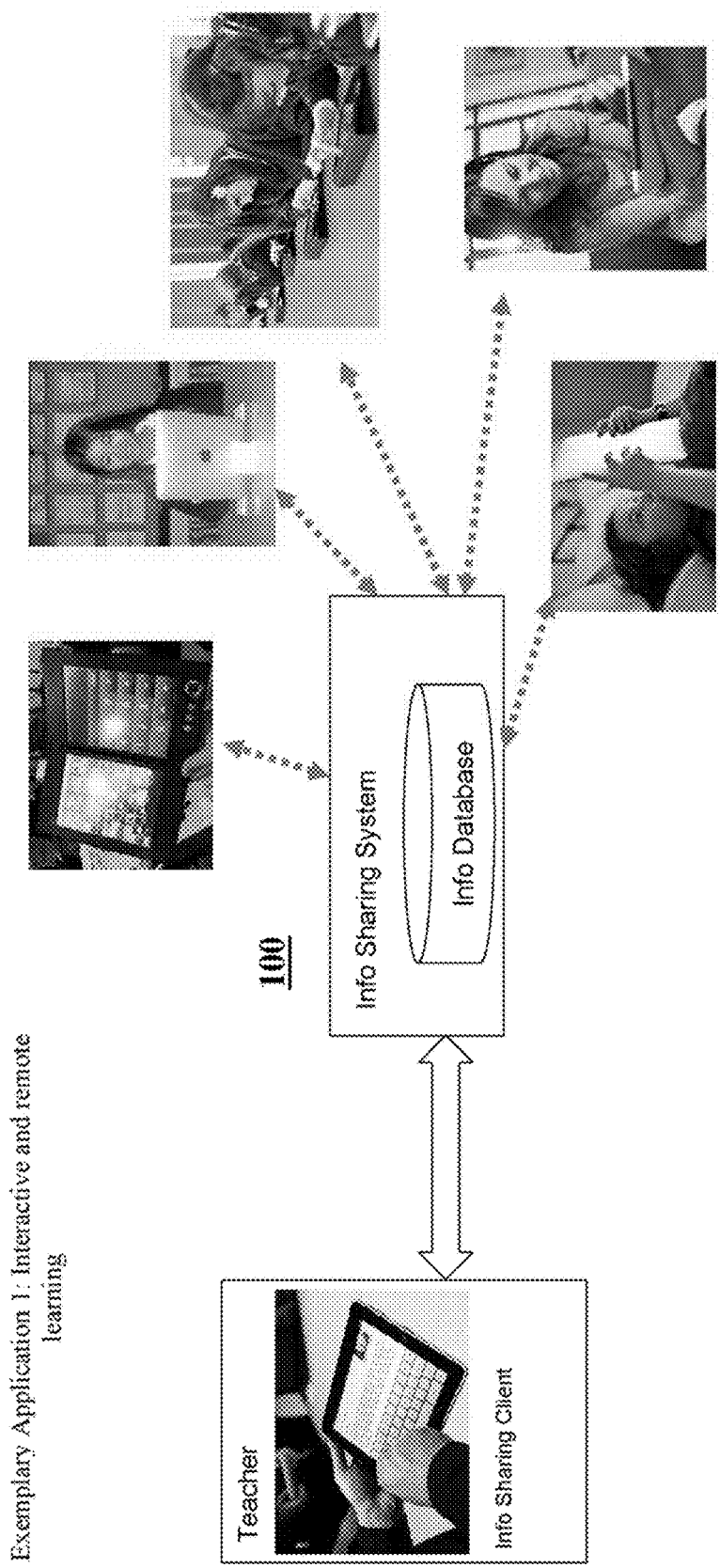
FIGS. 3(a)-3(g) are depictions of exemplary applications of a system for information sharing, according to different embodiments of the present teaching.

FIGS. 3(a)-3(g) depict exemplary applications of the information sharing system 100, according to different embodiments of the present teaching. FIG. 3(a) shows interactive and remote learning through the information sharing system 100. In one example, a teacher teaches online or offline with lecture notes (as base objects) and creates online or offline testing exams and homework assignments (as base objects). Teachers can also subscribe and make copies of standard teaching lectures, exams, and homework assignment and further customize the lectures, exams, and homework assignment to better suite the needs of his/her students. Students can learn online or offline by, for example, watching and listening to the lectures and completing the exams and homework assignments (as supporting objects associated with the base objects). The teacher may further review and comment on the student's answers to the exams and assignments by adding additional supporting objects to the exams and assignments. For offline learning, the lectures, exams, and assignments may be delivered and saved to the each student's local information sharing client 202. As noted above, the teacher and students may be members of the information sharing system 100, and the interactive and remote learning establishes a teach-student relationship between the members. The member account in the user database 106 may track the information sharing/exchange between the teacher and students in order to calculate the service charges that the students need to pay to the entity that runs the information sharing system 100 and the teacher. For example, the service charge calculation may be based on the number of base and/or supporting objects downloaded to the student's local information sharing client 202 (e.g., the total pages of lecture notes), the number of course subjects the students have subscribed, or the amount of time the teacher and/or the students has spent on the interactive and remote learning. It is understood that non-member users of the information sharing system 100 may also be able to participate in the learning for free through the information sharing system 100 either as the teacher and the student. In that case, the teacher may make a profit by adding advertisements on the teaching materials that he/she uploads to the information database 104, and the entity that runs the information sharing system 100 may also add additional advertisement on the teaching, materials to make a profit instead of charging the students directly. In addition, the students may provide feedbacks and ratings to the teachers and their teaching materials, and the feedbacks may be tracked in the member account as a factor to determine the service fees to be allocated to each teacher.

Figure 3B:
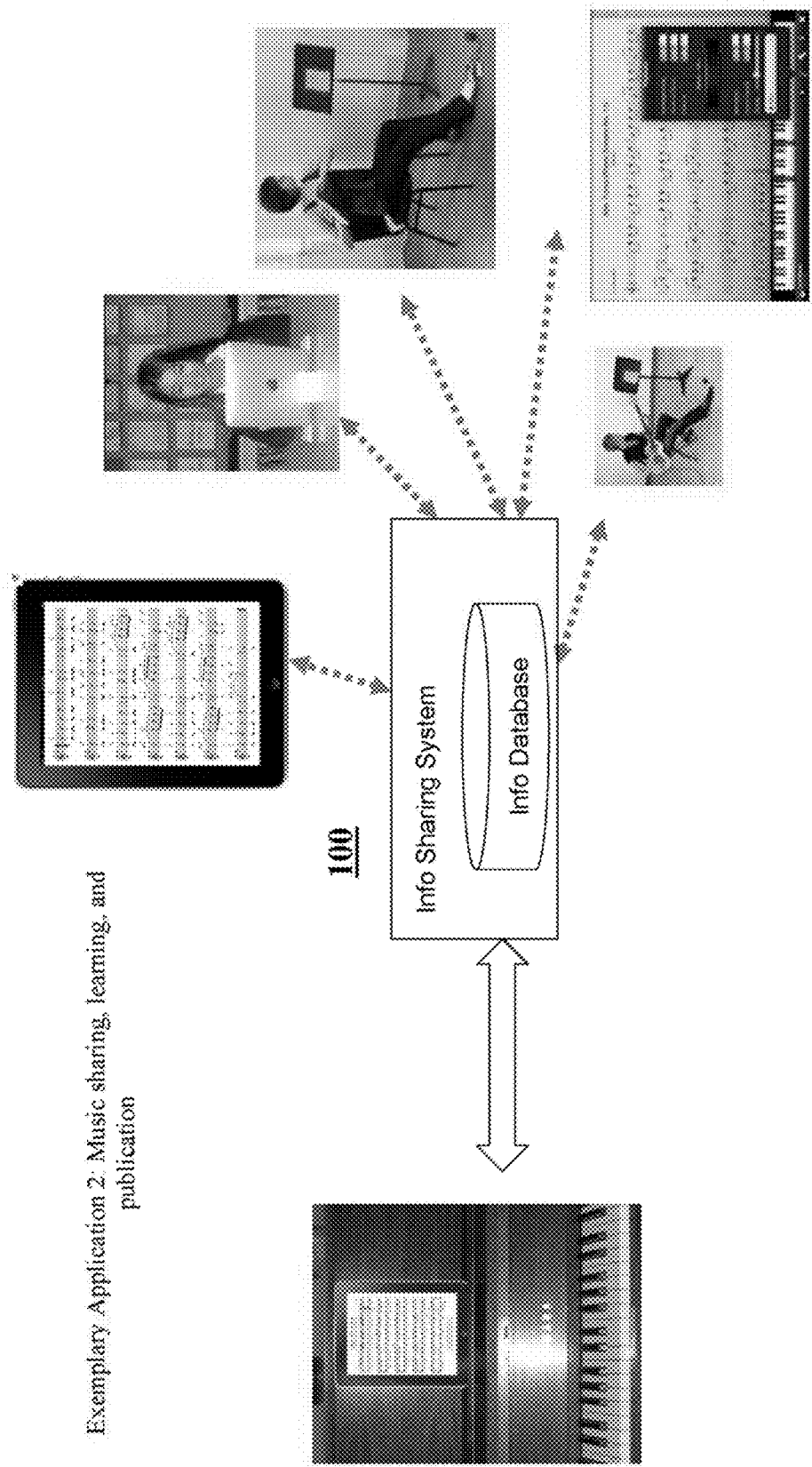

FIG. 3(b) shows music sharing, learning, and publication through the information sharing system 100. In this example, music sheets may be converted and stored as base objects in the forms of, for example, PDF, FLASH, or image files, which can be synchronized with supporting objects, such as instruments music or songs in the forms of audio or video files, add-on notes, highlighting, etc. Such a platform powers musicians and students to cooperate and learn based on the same standard base objects (the converted sheet music as the base objects). For example, the music recordings (as supporting objects) made by musicians may be synchronized with the music sheets (as base objects) and available to other users of the information sharing system 100. For example, musicians can compose and publish their sheet music as standard objects, or record their piano or other instrument playing, and upload the playing as the supporting objects to the information database 104 so that other users can share the recorded playing for various purposes such as entertainment, music learning, or publishing their own recording with the professional music accompaniments. The information database 104 may contain standard music sheets for the musicians to record and upload their music accompaniments as supporting objects to the standard music sheets. Moreover, since the base and supporting objects may be stored locally instead of being transmitted as video streaming, the music sharing and learning in this example can be achieved with minimum latency.

In this example, the music accompaniment made by famous musicians could be featured and available for other users to sing along or to play their music instruments along with, at a certain price. This allows musicians to publish their recording through the information sharing system 100 to easily promote and sell their music pieces. It is understood that users of the music sharing, learning, and publication application may be either members or non-members, and the monetization schemes may vary accordingly as noted above. For example, for members, service charges may be incremented for each music accompaniment download and tracked in the members' accounts in the user database 106. In one example, the information sharing system 100 may be used to facilitate such transactions by splitting the collected service fees between the musicians and entity that runs the information sharing system 100.

In one example, different users (e.g., musicians) can post their performance on a piece of music, and another user can select and choose to compose different pieces together to make e.g., a symphony in another example, a composer can post his/her music and solicit other users to play different instruments and then put them together. The put-together music may be distributed or downloaded to make a profit. In this example, information sharing system 100 may keep track of which piece is actually incorporated into the final performance and the number of downloads. In one example, the entity that runs the information sharing system 100 may make a profit by taking a percentage of the income, and at the same time, the information sharing system 100 may keep track of the contributors to make sure that they will also get paid because their piece has been incorporated into the final product. In a similar vein, the information sharing system 100 may generate a sharing object that comprises all the information generated from the original base object, which, for example, includes all the modifications of the original content of the user file, and all the add-on comments, notes, explanations, reviews, etc., in the forms of supporting objects and synchronizing actions. Such sharing object may have its special value as a new piece of information and may be distributed and downloaded by any user. In one example, the base object itself may contain a solicitation to a particular group of users (e.g., collaborators in the same entity) or to all users of the information, sharing system 100 for contributing to the sharing object. It is also understood that the applications in FIGS. 3(a) and 3(b) may be combined such that interactive and remote music learning may be achieved through the information sharing system 100.

Figure 3C:
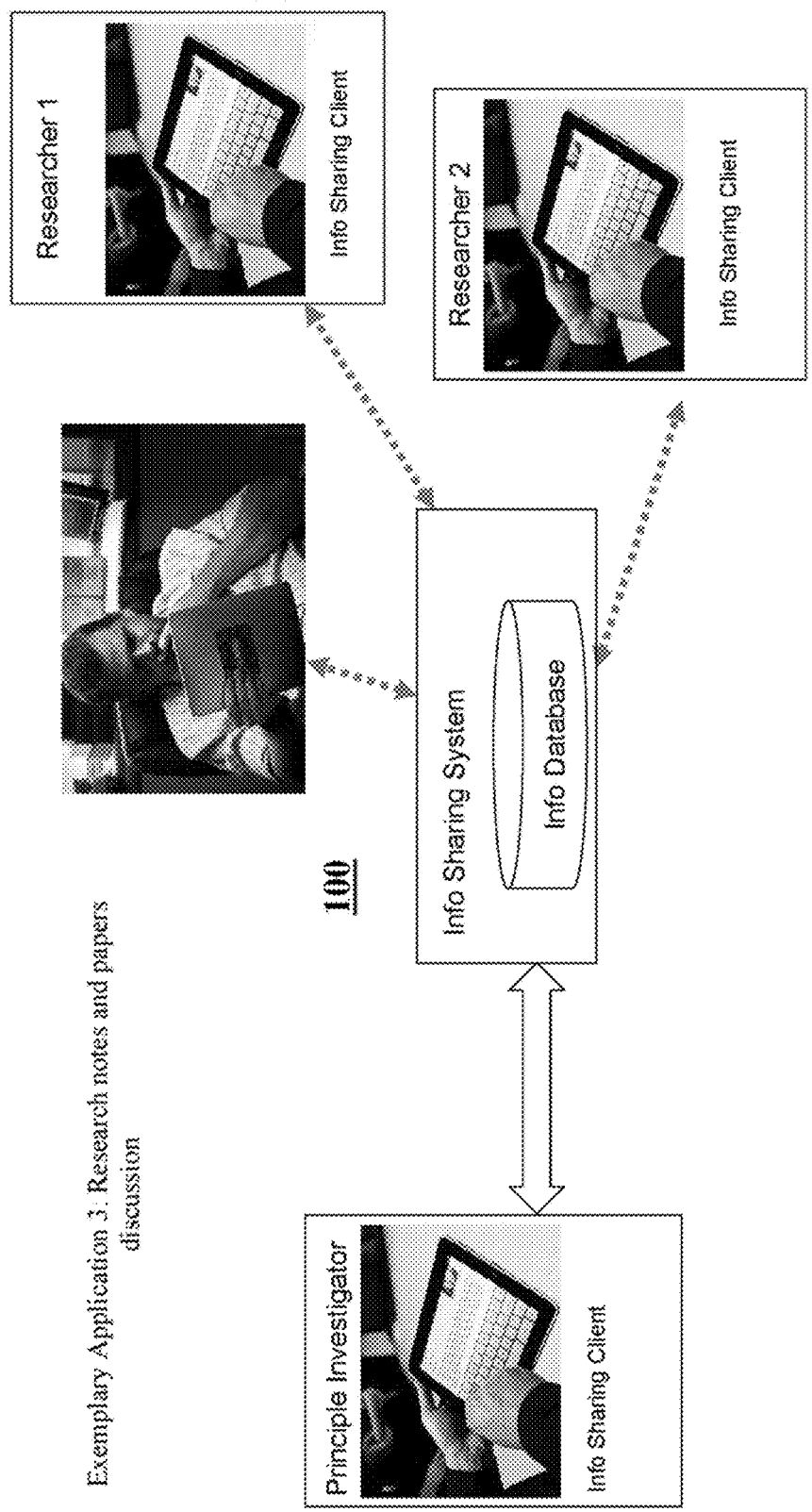
Figure 3D:
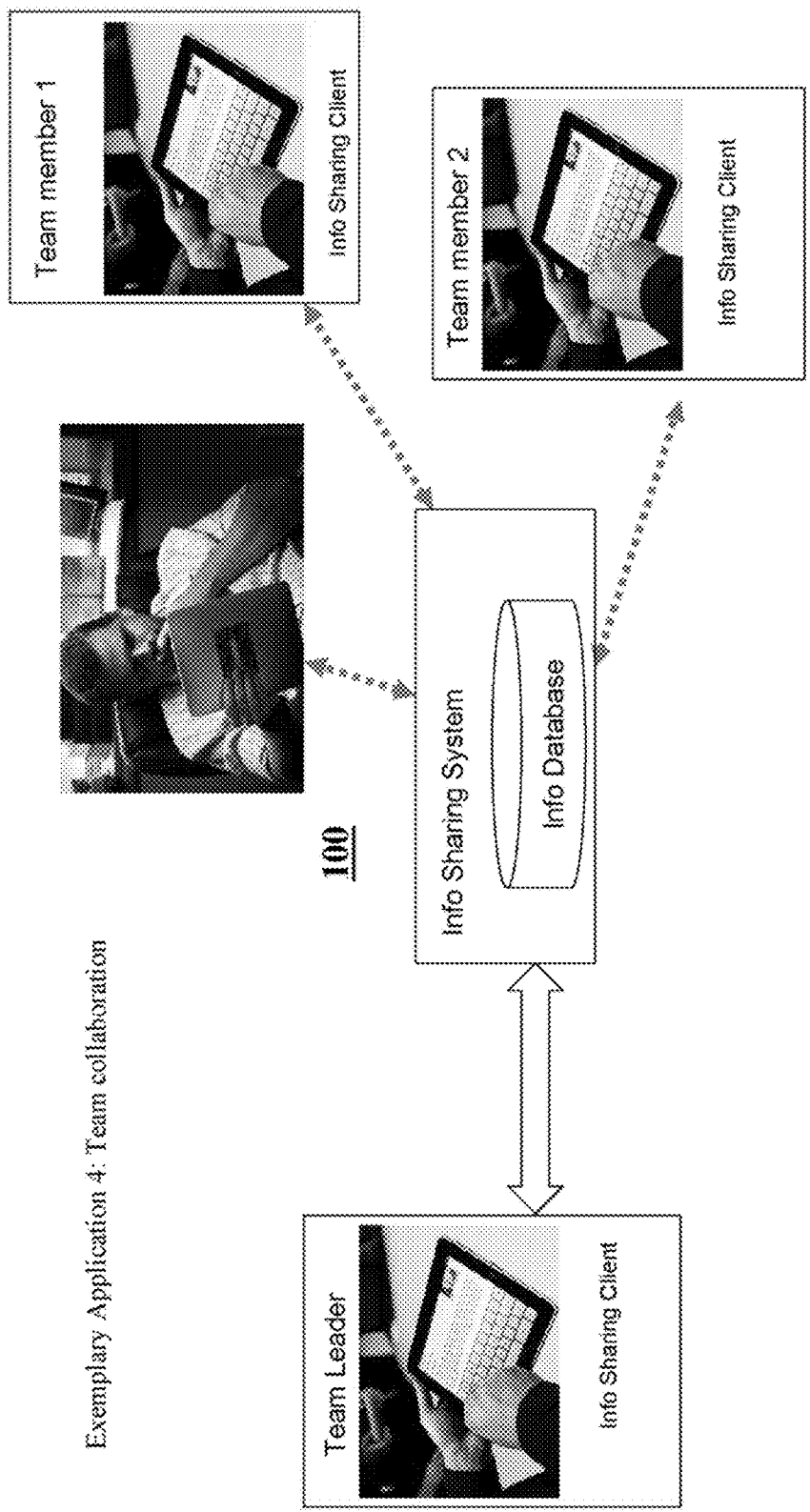
Figure 3E:
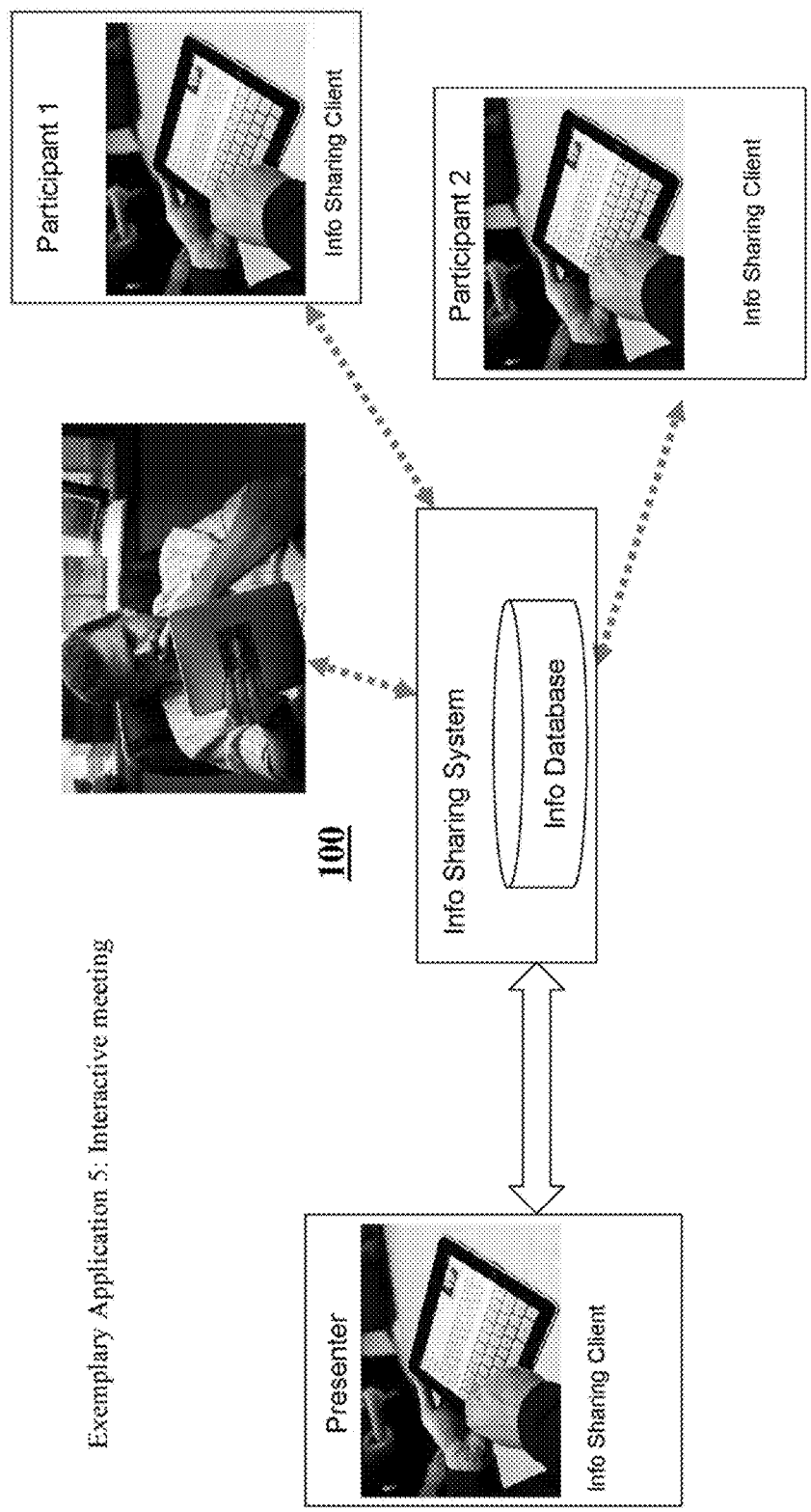
Figure 3F:
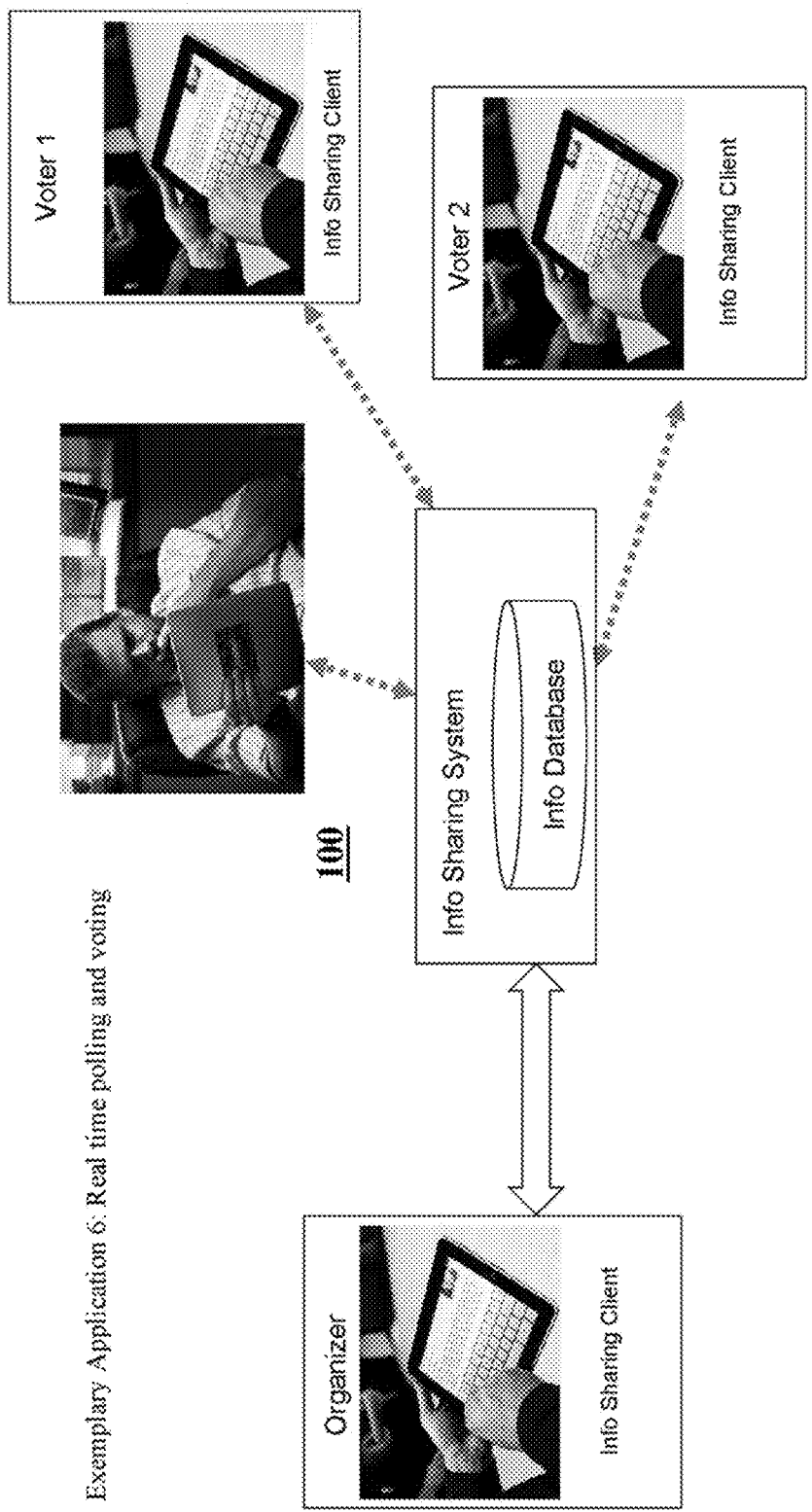
Figure 3G:
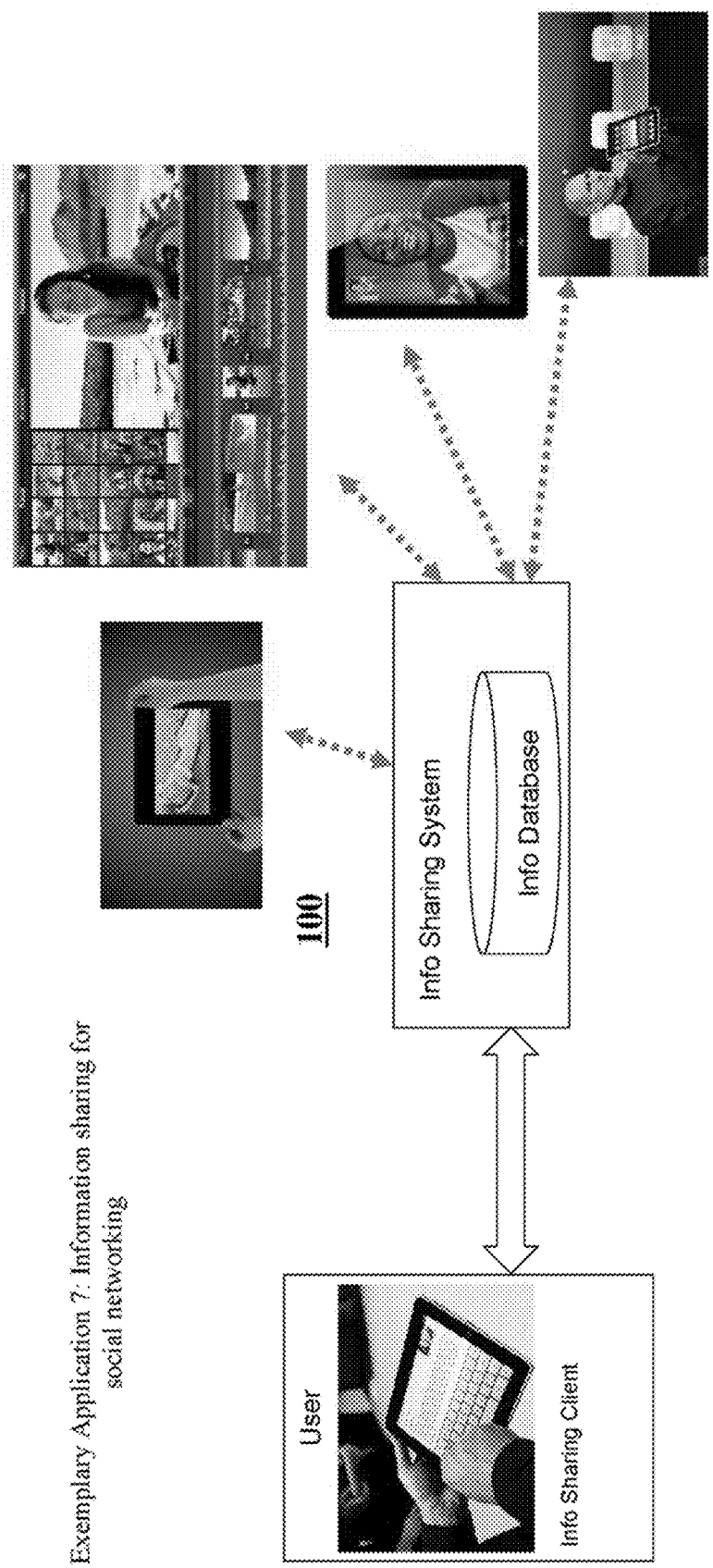

FIG. 3(c) shows research notes and papers discussion through the information sharing system 100. Research lab often requires their research members to share notes and publications. Research notes are often written in a document and word processing file format, such as MICROSOFT WORD, and need to be shared with other researchers. In this example, the information sharing system 100 provides an intuitive and effective way to achieve the research notes and papers sharing among researchers. For example, the research note and papers may be generated as base objects and shared with other members in the research lab. The researchers may comment on the base objects by adding supporting objects in various forms as noted above. Similarly, FIG. 3(d) shows team collaboration through the information sharing system 100. In this example, any team member can save documents, ideas or any information to the information database 104 through the information sharing system 100 in order to share the information with collaborators. In one example, the base and supporting objects may used as the work requirements or work specification such that the team leader or manager can assign the base and supporting objects to team members as work assignments to manage teamwork. FIG. 3(e) shows interactive meeting through the information sharing system 100. In this example, the information sharing system 100 may enable users to conduct an online meeting with minimum latency. For example, during the meeting, the presenter may switch pages of a document, highlight certain areas, play animations, and playback pre-recorded audio files that are synchronized with the page switching or the animation. Because such meeting may only transfer the dynamic synchronizing actions without sending massive amount of video stream data, it provides a better user experience. The interactive meeting will be described in detail later. FIG. 3(f) shows real-time polling and voting through the information sharing system 100. In this example, because information can be shared as base objects, and multiple users can input their notes, comments, and ratings (as supporting objects) for approval or disapproval, the information sharing system 100 may be applied for real-time polling and voting when multiple inputs are required in real-time for making team consent and agreement. FIG. 3(g) shows information sharing for social networking through the information sharing system 100. In this example, any information such as documents can be easily converted to movie-like presentations as base objects by the information sharing system 100. Thus, even users with little computer knowledge may produce professional-quality presentations. The information sharing system 100 may be integrated with any other social-networking tools for more impressive and effective information sharing.

Figure 4:
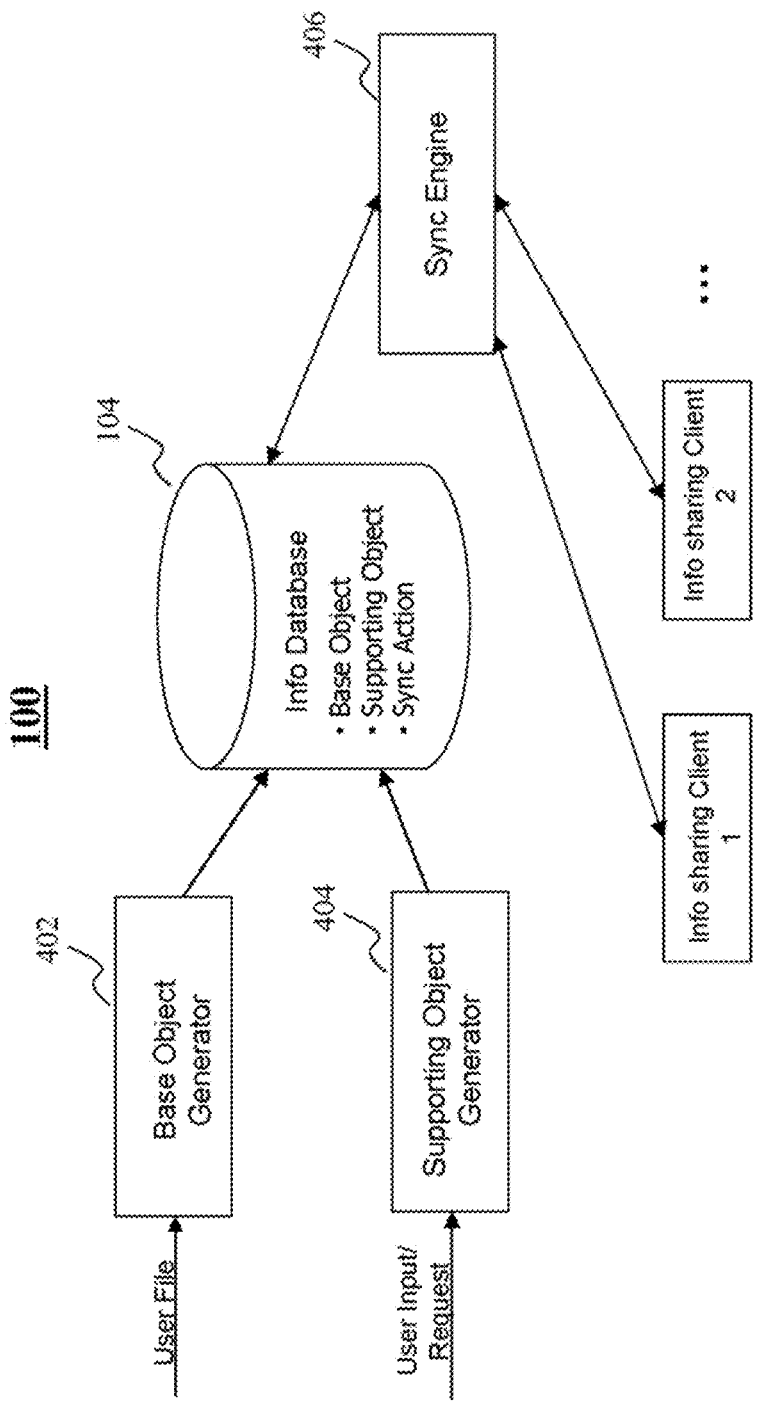
FIG. 4 is a diagram of an exemplary information sharing controller of a system for information sharing, according to an embodiment of the present teaching.

FIG. 4 depicts an exemplary diagram of the information sharing controller 102, according to an embodiment of the present teaching. In this example, the information sharing controller 102 includes a base object generator 402, a supporting object generator 404, and a synchronizing engine 406, each operatively coupled to the information database 104. The base object generator 402 may be configured to convert a user file to a base object of a certain type such that the information in the user file is accessible to any user via a web browser or an application. The base object generator 402 may reside on a server in the "cloud" or on the local information sharing clients 202. The base object generated by the base object generator 402 may be stored in the information database 104 directly if the base object generator 402 is in the "cloud" or may be stored in the local database and uploaded to the information database 104 later if the base object generator 402 is on the local information sharing clients 202.

The information sharing controller 102 may also include a supporting object generator 404 configured to generate the supporting objects to be associated with the base objects in response to user inputs and requests. As noted above, the supporting objects may include time-based supporting objects that are synchronized with the base object in a time scale and non-time-based supporting objects that are coordinated with the base object in a space scale. The supporting objects then may be stored in the information database 104 as separate files from the associated base objects. Similar to the base object generator 402, the supporting object generator 404 may reside on a server in the "cloud" or on the local information sharing client 202.

The information sharing controller 102 may further include a synchronizing engine 406 configured to generate synchronizing actions for manipulating and associating the base objects and corresponding supporting objects. For example, the base objects and supporting objects may already exist in the local database of the local information sharing client 202 where the base and supporting objects are generated or may be pre-downloaded to the local database. Thus, only the dynamically changed synchronizing actions need to be transferred from the information database 104 to each user's local information sharing client 202 to coordinate the presentation of the base and supporting objects on the local information sharing client 202.

Figure 5:
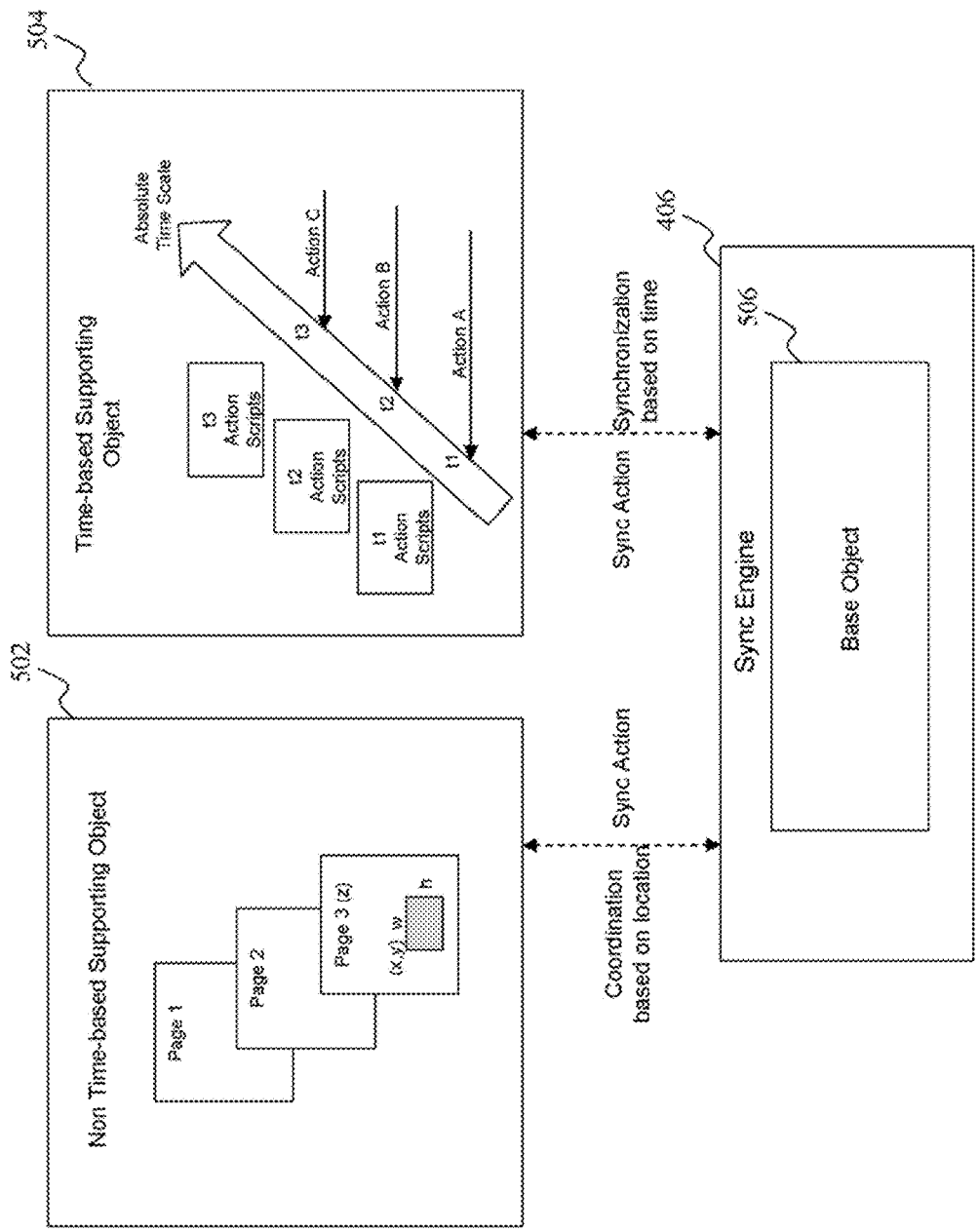
FIG. 5 is a depiction of an exemplary non-time-based supporting object and time-based supporting object, according to an embodiment of the present teaching.

FIG. 5 is a depiction of an exemplary non-time-based supporting object 502 and time-based supporting object 504, according to an embodiment of the present teaching. For non-time-based supporting object 502, those visual objects are coordinated with the base objects 506 by specifying the relative scale coordinates on the base objects 506. The base object 506 may be represented as a visual object with three dimensions, including page numbers representing the z coordinate and the horizontal and vertical coordinates (x, y) representing a position where the non-time-based supporting object 502 to be placed initially, along with the width and height of the non-time-based supporting object 502, as shown in FIG. 5. In one example, standard resolutions/coordinates may be applied for coordinating the non-time-based supporting object 502 on the base object 506. For example, the information sharing system 100 may use a relative scale mechanism of height and width of the base object 506, allowing the non-time-based supporting object 502 to be displayed independent of screen size or resolution.

For time-based supporting object 504, these objects and the base object 506 may be synchronized in a time scale. As shown in FIG. 5, each time-based supporting object 504 or each part of a time-based supporting object 504 may be activated at a correct time as triggered by one or more synchronizing actions. The synchronizing engine 406 may use time as the coordinating scale so that any audio, video, mouse movements, animations, visual-effects, applications, or any other time-based supporting object 504, are recorded with the absolute value of time. For example, as a user plays hack the recorded audio or an animation, synchronizing actions may be used to synchronize the audio or animation with the base object. The synchronizing actions may include information regarding, for example, on which page or at what time to active the time-based supporting object 504. Synchronizing multiple time-based supporting objects 504 may also be supported. For example, recorded animations may be saved and played back while playing back the audio. In addition, time-based supporting objects 504 may be synchronized with a video type base object 506. This can be achieved in a way similar to how the time-based supporting objects 504 are handled with respect to the document type base objects 506.

Figure 6:
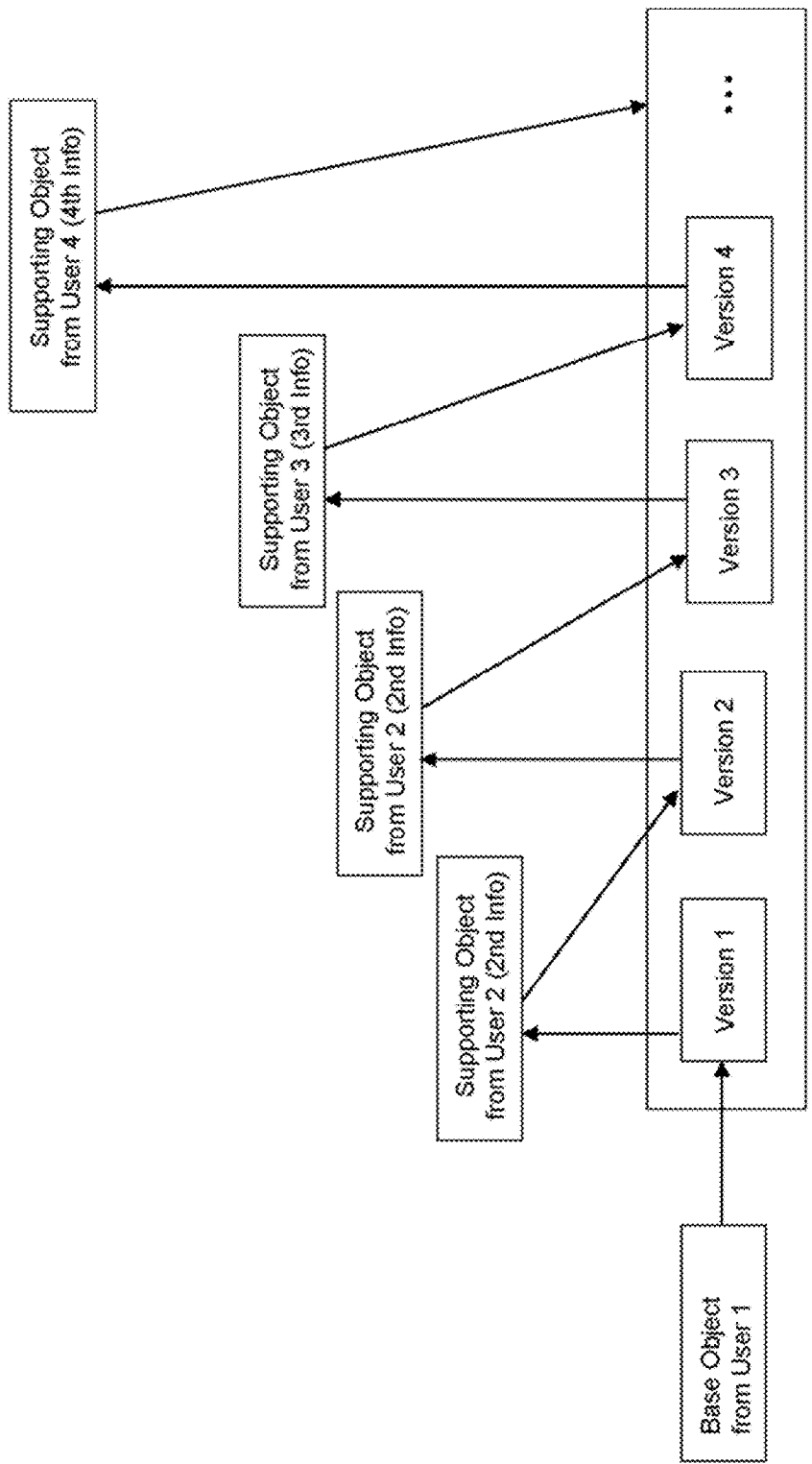
FIG. 6 is a depiction of an exemplary process of synchronizing supporting objects with a base object, according to an embodiment of the present teaching.

FIG. 6 is a depiction of an exemplary process of synchronizing supporting objects with a base object, according to an embodiment of the present teaching. In this example, different users may add different supporting objects, which may be synchronized by time base coordinates and/or the three-dimensional space coordinates, as noted above. In this example, a version control mechanism may be applied to control the modification of the base object and the association of additional supporting objects to the different versions of the base object. For example, once a user modifies the content of the user file, the base object may be converted again and labeled as a new version to distinguish it from the previous version fin one example, a new supporting object may be always associated with the latest version of the base object. In another example, the supporting objects associated with the latest version of the base object may be re-associated with the latest version of the base object if necessary. It is understood that some or all of the versions of a base object may be temporally or permanently stored in the information database 104 and/or local database if necessary.

Figure 7:
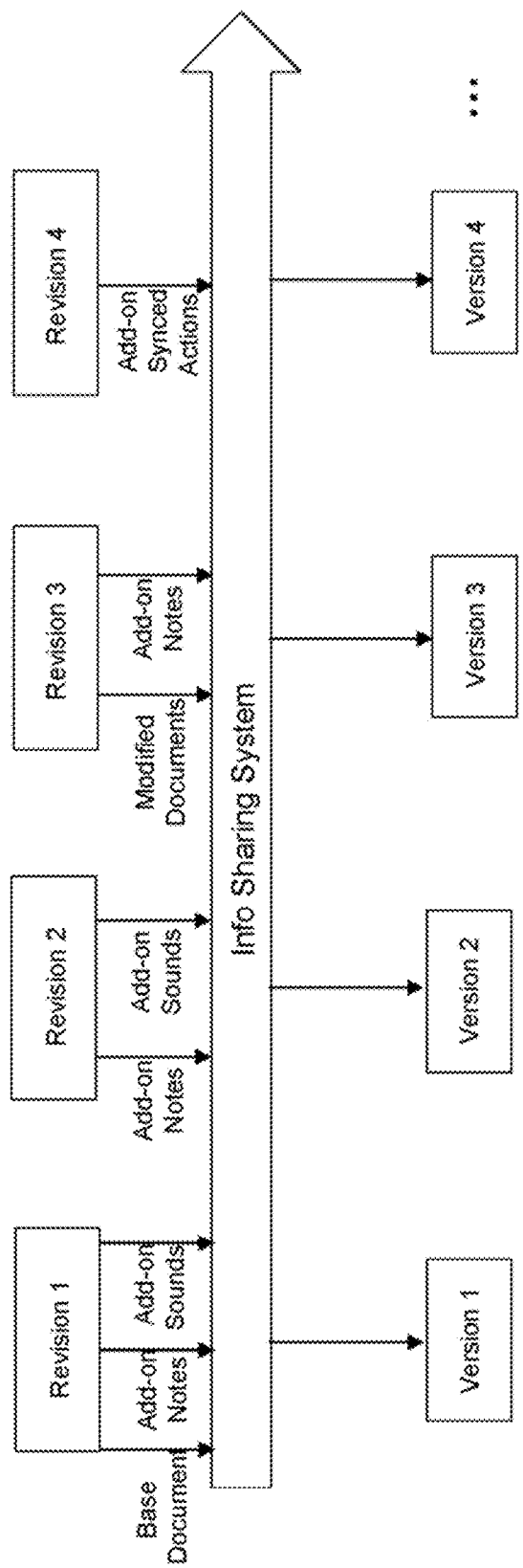
FIG. 7 is a depiction of another exemplary process of synchronizing supporting objects with a base object, according to an embodiment of the present teaching.

FIG. 7 is a depiction of another exemplary process of synchronizing supporting objects with a base object, according to an embodiment of the present teaching In this example, not only the base object is version controlled, but also the supporting objects and synchronizing actions may be version controlled. In this example, a base object with its associated supporting object(s) and synchronizing actions may be defined as a sharing object. Any change on the base object, supporting objects, or synchronizing action may trigger the information sharing system 100 to record a new version of the sharing object. For example, adding new add-on notes and sounds to the sharing object may generate a new version of the sharing object; modifying the base document may generate a new version of the sharing object; adding a new synchronizing action to the previous version may also generate a new version of the sharing object In this example, the information sharing system 100 may regenerate each version of a sharing object with the corresponding base object, supporting object(s), and synchronizing action (s).

Figure 8A:
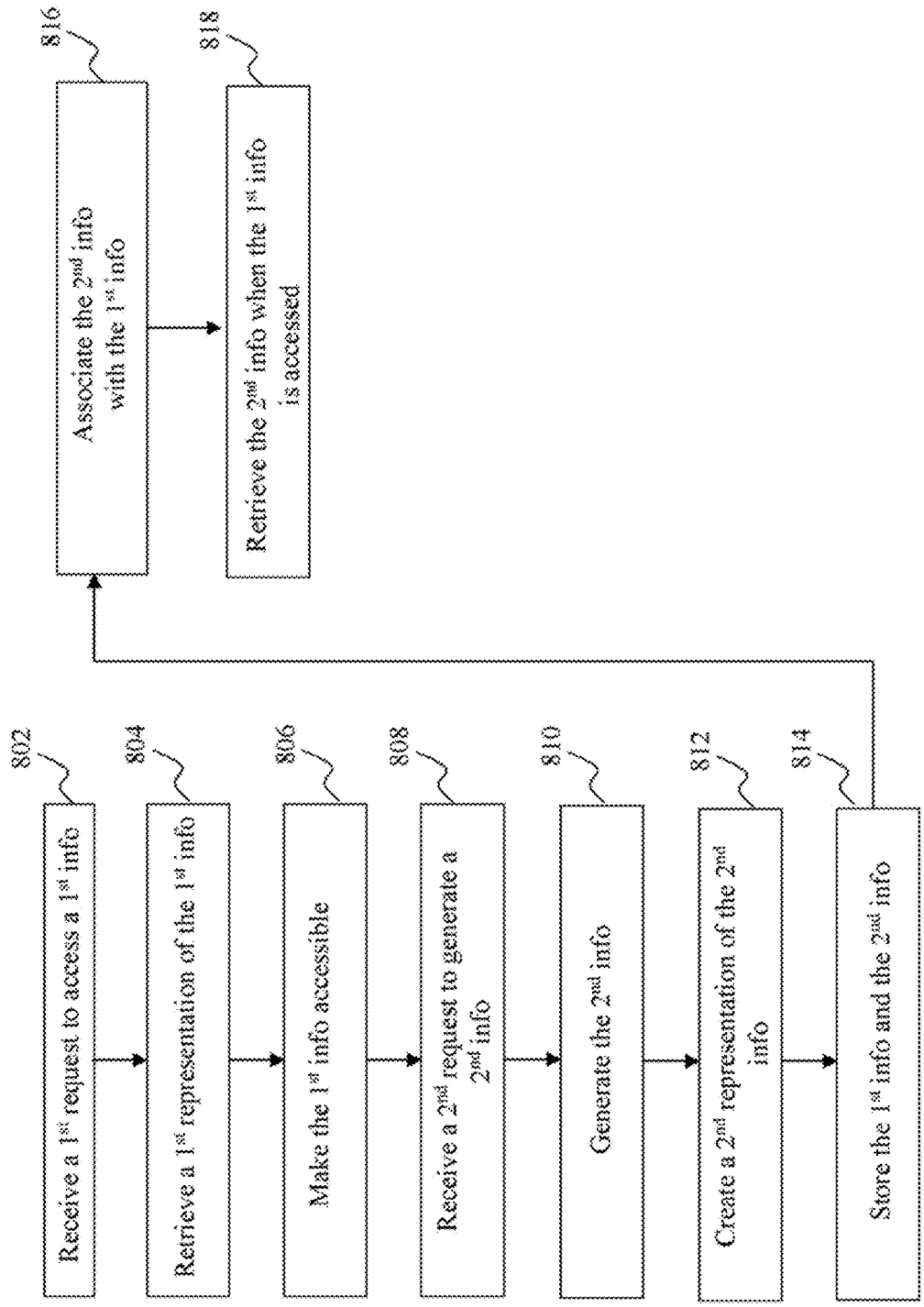
FIGS. 8(a) and 8(b) are flowcharts of exemplary processes of information sharing, according to different embodiments of the present teaching.
Figure 8B:
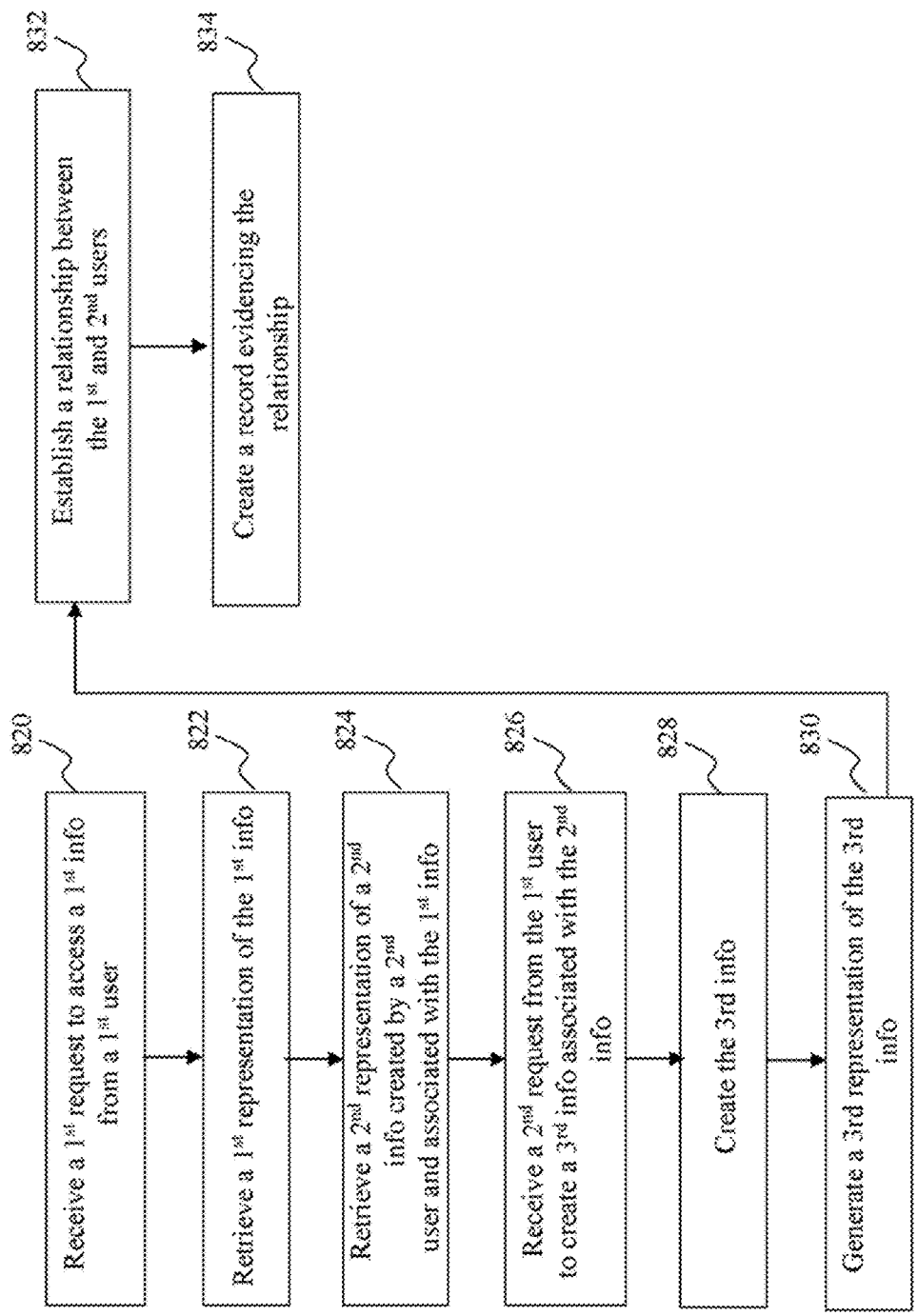

FIGS. 8(a) and 8(b) are flowcharts of exemplary processes in which information sharing is performed, according to different embodiments of the present teaching. In FIG. 8(a), staring from block 802, a first request is received from a user to access a first piece of information in the information database 104. As a response to the first request, at block 804, a first representation of the first piece of information is retrieved. At block 806, the first piece of information is made accessible to the user. For example, the information sharing system 100 may convert the first piece of information to a base object of a certain type and present the base object to the user as a response to the first request.

Moving to block 808, it second request to generate a second piece of information based on the first piece of information is received. At block 810, the second piece of information is generated based on an input received from the user. At block 812, a second representation of the second piece of information is created. For example, the information sharing system 100 may receive a second request from the user to generate a second piece of information, such as a supporting object and/or a synchronizing action, based on the base object. The information sharing system 100 may generate the second piece of information based on the user's inputs and create a representation of the second piece of information so that other users may retrieve the second piece of information. In one example, the second representation may be an indication of the second piece of information available for retrieval, such as a list of supporting objects that are associated with the first piece of information for selection.

Moving to block 814, the first and second pieces of information are stored, for example, in the information database 104 or local databases. At block 816, the second piece information is associated with the first piece of information. At block 818, when the first piece of information is accessed, the second representation of the second piece of information is retrieved. For example, the second representation and the first representation may be marked as associated with each other so that whenever the first piece of information is accessed in the future, the second piece of information is made available.

In FIG. 8(b), starting from block 820, a first request is received from a first user to access a first piece of information. In response to the first request, at block 822, a first representation of the first piece of information is retrieved. At block 824, a second representation of a second piece of information created by a second user and associated with the first piece of information is retrieved. For example, the information sharing system 100 may receive a first request from a first user to access a first piece of information. In response to the first request, the base object and its associated supporting objects and synchronizing actions created by a second user may be retrieved and presented to the first user as the first and second pieces of information, respectively. In one example, the representation of the second piece of information may include a solicitation for a response to the second piece of information. For example, the first piece information may be a music sheet, and the second piece of information may be a playing of the music sheet made by the second user with a solicitation to the first user for comments on the playing.

Moving to block 826, a second request is received from the first user to create a third piece of information associated with the second piece of information. At block 828, the third piece of information is created based on an input from the first user. Moving to block 830, a third representation is created for the third piece of information. The third representation includes an indication of association to the second piece of information. At block 832, a relationship between the first and the second users is established. For example, the information sharing system 100 may further receive a second request from the first user to create a third piece of information, such as additional supporting objects and/or synchronizing actions. The information sharing system 100 then may create the third piece of information and establish a relationship between the first and second users. At block 834, once the relationship is established, a record may be created as an evidence of the relationship by the information sharing system 100. In one example, the third piece of information (e.g., comments made by the first user on the second user's playing) may be transmitted back to the second user as a response to the solicitation for comments.

Figure 9:
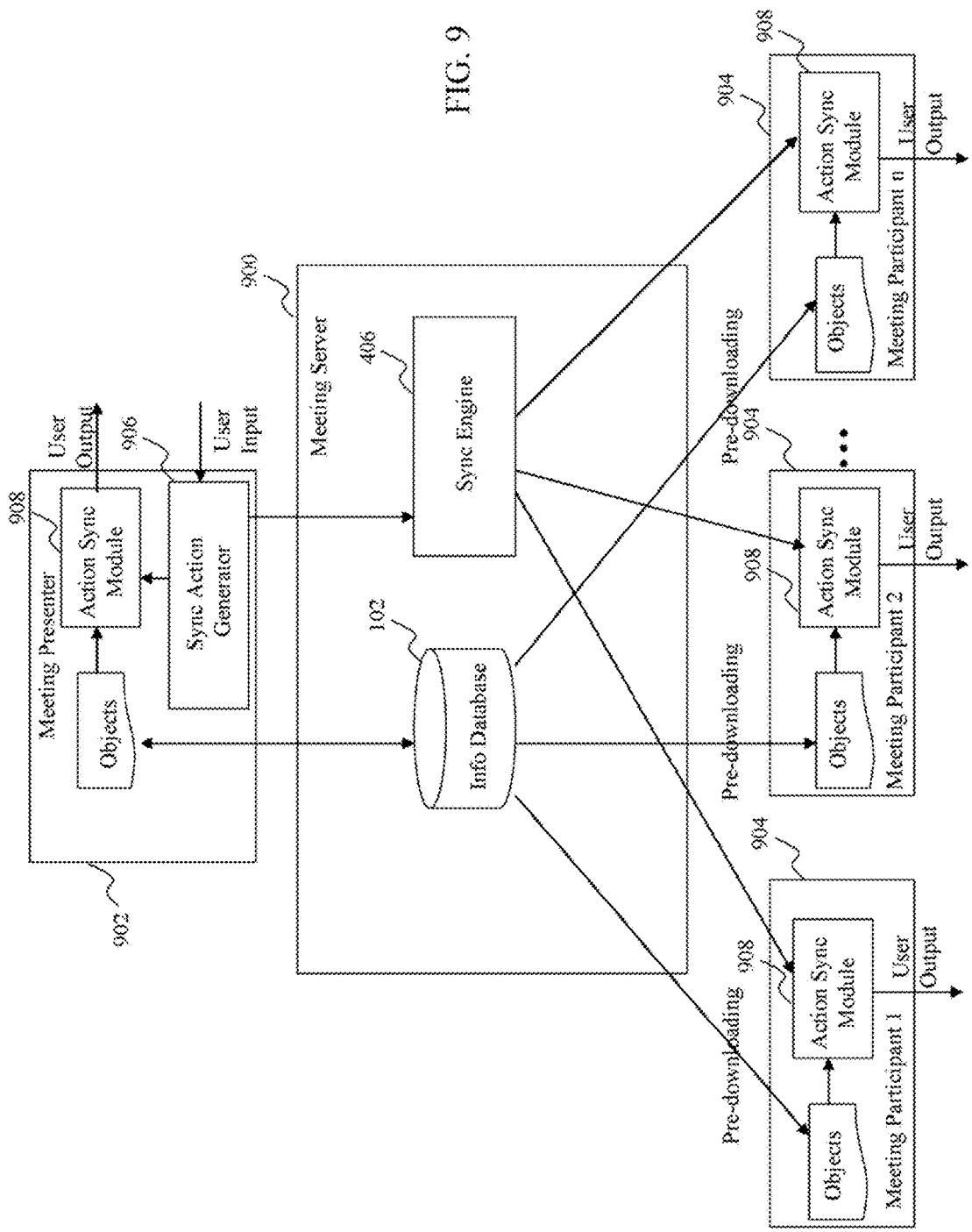
FIG. 9 is an exemplary diagram of a system for online meeting, according to an embodiment of the present teaching.

FIG. 9 is an exemplary diagram of a system for online meeting, according to an embodiment of the present teaching. In this example, the system may include a meeting server 900 residing in the "cloud" and local meeting clients 902, 904 for the meeting presenter (host) and participants (guests). The meeting server 900 may include the information database 104 that stores the base and supporting objects and the synchronizing engine 406 operative to simultaneously dispatch dynamic synchronizing actions (actionable items) received from the meeting presenter 902 to each meeting participant 904. In this example, the base and supporting objects, such as the presentation slides and comments, may be pre-downloaded to the local database of each meeting participant 904. During the meeting, the presenter 902 may dynamically generate new synchronizing actions by the synchronizing action generator 906, such as moving the mouse cursor on the presentation slides, highlighting an area, or switching pages. These dynamic synchronizing actions may be synchronized with the base object and supporting objects and outputted to the presenter 902. At the same time, the dynamic synchronizing actions may be simultaneously transmitted to the action synchronizing module 908 of each participant in real-time. Similarly, these dynamic synchronizing actions may be synchronized with the base object and supporting objects and presented to each participant 904.

Figure 10:
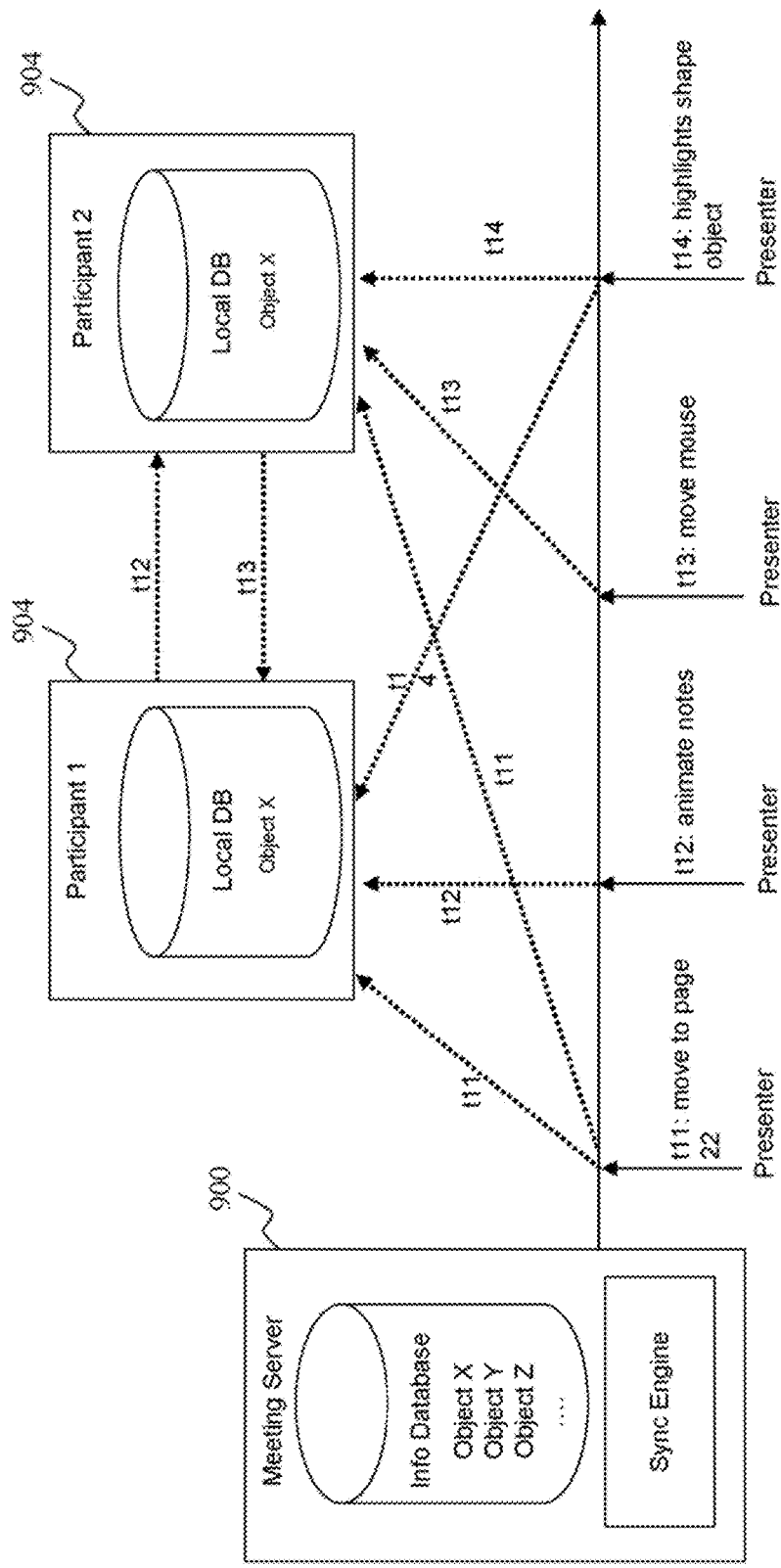
FIG. 10 is a depiction of an exemplary process of online meeting, according to an embodiment of the present teaching.

For example, in FIG. 10, an object x may be presentation slides that have been pre-downloaded to the local database of each participant before the meeting starts. At time t11, the presenter may generate a first dynamic synchronizing action (actionable item) of switching the presentation slides to page 22. The first dynamic synchronizing action may be dispatched to each meeting participant at substantially the same time of t11, such that the presentation slides on each participant's machine may be also switched to page 22. At time t12, the presenter may create a second dynamic synchronizing action of adding an animation note on page 22. In one example, the animation note may exist in the local database of participant 1, and thus, only the dynamic synchronizing action itself needs to be transferred to participant 1 to instruct which and where the animation note needs to be added. However, if participant 2 does not have the animation note in its local database, it may retrieve the animation note from participant 1 or from the information database. Also, the second dynamic synchronizing action may not be directed dispatched from the meeting server to participant 2 but instead, may be transmitted from participant 1. As shown in FIG. 10, other dynamic synchronizing actions, such as moving mouse cursor and highlighting, may also be dispatched to the participants in a similar manner as noted above.

Figure 11A:
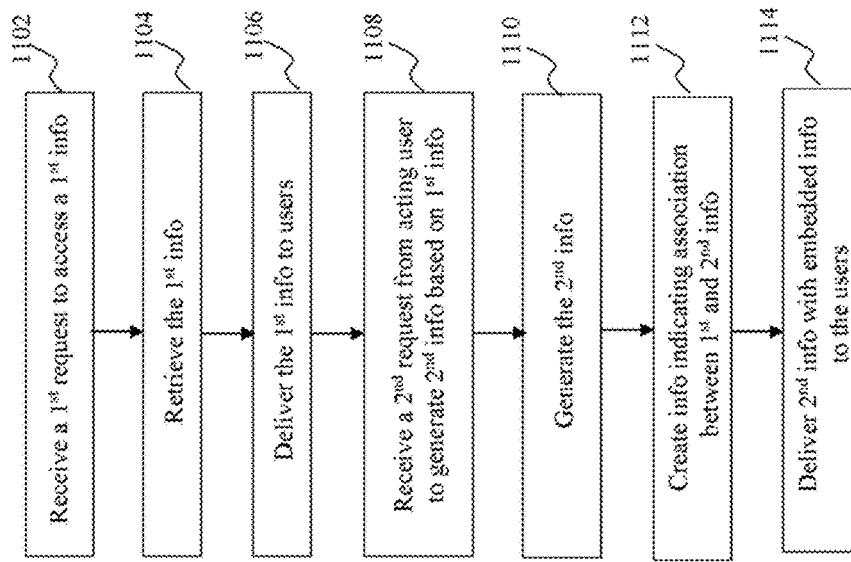
FIGS. 11(a) and 11(b) are flowcharts of exemplary processes of online meeting, according to different embodiments of the present teaching.
Figure 11B:
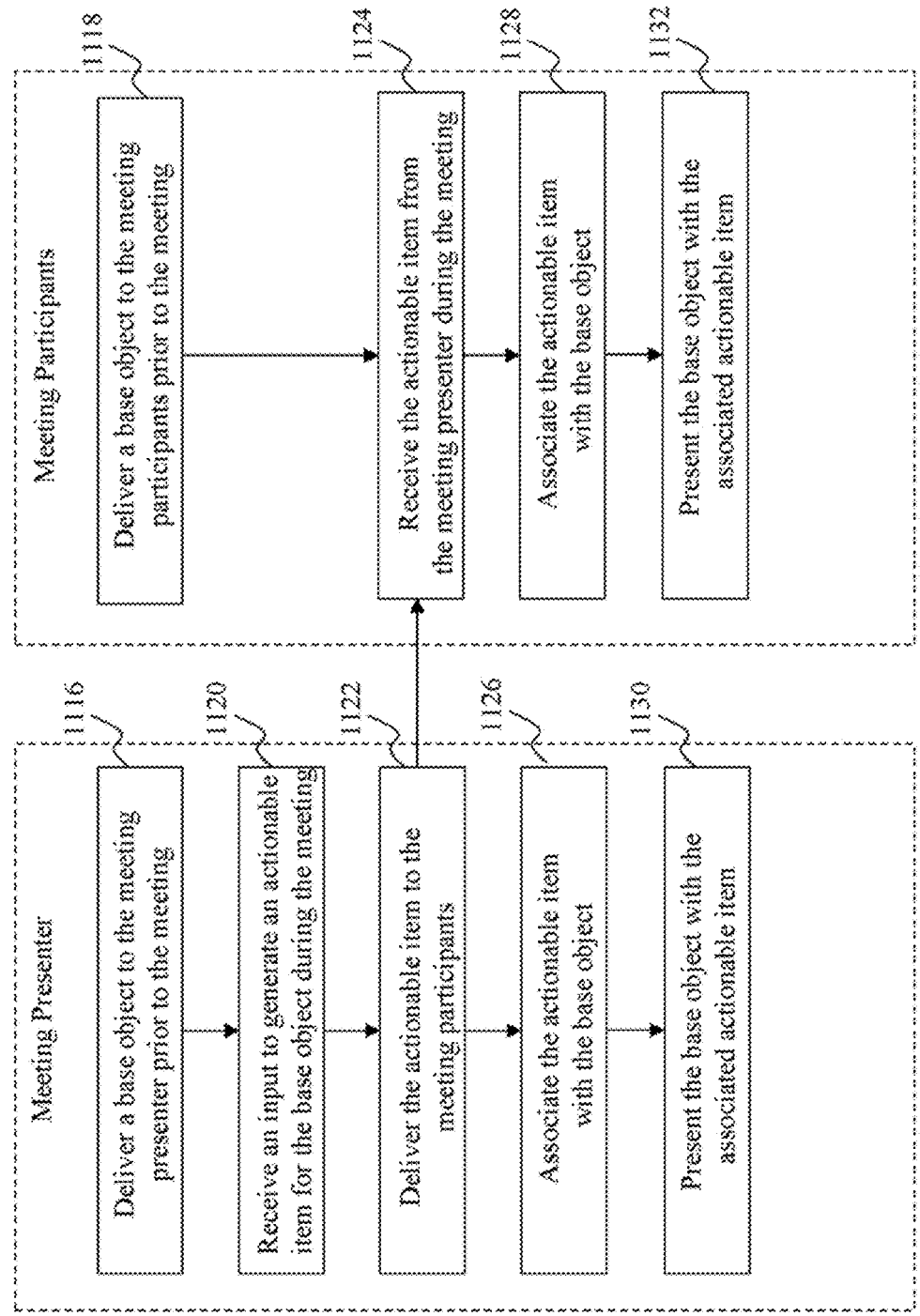

FIGS. 11(a) and 11(b) are flowcharts of exemplary processes in which online meeting is performed, according to different embodiments of the present teaching. In FIG. 11(a), starting at block 1102, a first request to access a first piece of information is received. The first request is associated with a plurality of users, e.g., meeting participants 904. The first piece of information may be base objects and supporting objects, such as presentation slides, comments, or other shared documents for the meeting. At bock 1104, the first piece of information is retrieved as a response to the first request. The retrieved first piece of information is delivered to the plurality of users to become accessible at block 1106. For example, the meeting server 900 may retrieve the presentation slides from the information database 102 so that each meeting participant 904 can pre-download the presentation slides before the meeting starts.

At block 1108, a second request is received from an acting user, e.g., the meeting presenter 902, to generate a second piece of information based on the first piece of information. At block 1110, the second piece of information, e.g., synchronizing actions, is generated based on an input received from the acting user. For example, during the meeting, the presenter 902 may dynamically generate new synchronizing actions by the synchronizing action generator 906, such as moving the mouse cursor on the presentation slides, highlighting, an area, or switching pages. Proceeding to block 1112, information indicating an association between the second piece of information and the first piece of information is created. For example, dynamic synchronizing actions may be synchronized with the base object and supporting objects and output to the presenter 902. At block 1114, the second piece of information with embedded information indicating the association is delivered to the plurality of users. For example, the dynamic synchronizing actions may be simultaneously transmitted to the action synchronizing module 908 of each participant 904 in real-time.

In FIG. 11(b), before the meeting starts, the meeting server 900 delivers a base object, e.g., presentation slides, to the meeting presenter 902 and each meeting participant 904 at blocks 1116 and 1118, respectively. During the meeting, the meeting server 900, at block 1120, receives an input from the meeting presenter 902 to generate an actionable item for the base object, such as moving the mouse cursor on the presentation slides, highlighting an area, or switching pages. At block 1122, the meeting server 900 delivers the actionable item to all the meeting participants 904 simultaneously, and each meeting participant 904 receives the actionable item in real-time during the meeting at block 1124. The action item is then associated with the base object for the meeting presenter 902 and meeting participants 904 at blocks 1126 and 1128, respectively. The base object with the associated actionable item is then presented to the meeting presenter 902 and meeting participants 904 at blocks 1130 and 1132, respectively.

This online meeting not only allows users to view the same shared document, but also transfers the synchronizing actions performed by the presenter to all participants instantly. Since the size of the synchronizing action data is relative small, the latency is minimized. As a result, the participants can view the synchronized actions as the meeting presenter performs them in real-time. It thus provides a real-time and in-person feeling for the meetings to the end users. Not having any latency and providing an in-person feeling promote a more effective communication tool to its users. In addition, meetings can be recorded and played back by other users so that those people who are not able to attend the meeting in live may view the exactly same meeting at a later time. Furthermore, since the recorded meetings are the synchronized actions saved in sequential order based on the time scale, such recorded meetings have very small file sizes and provide more advantages over traditional methods where online meetings are recorded as video files with large size.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
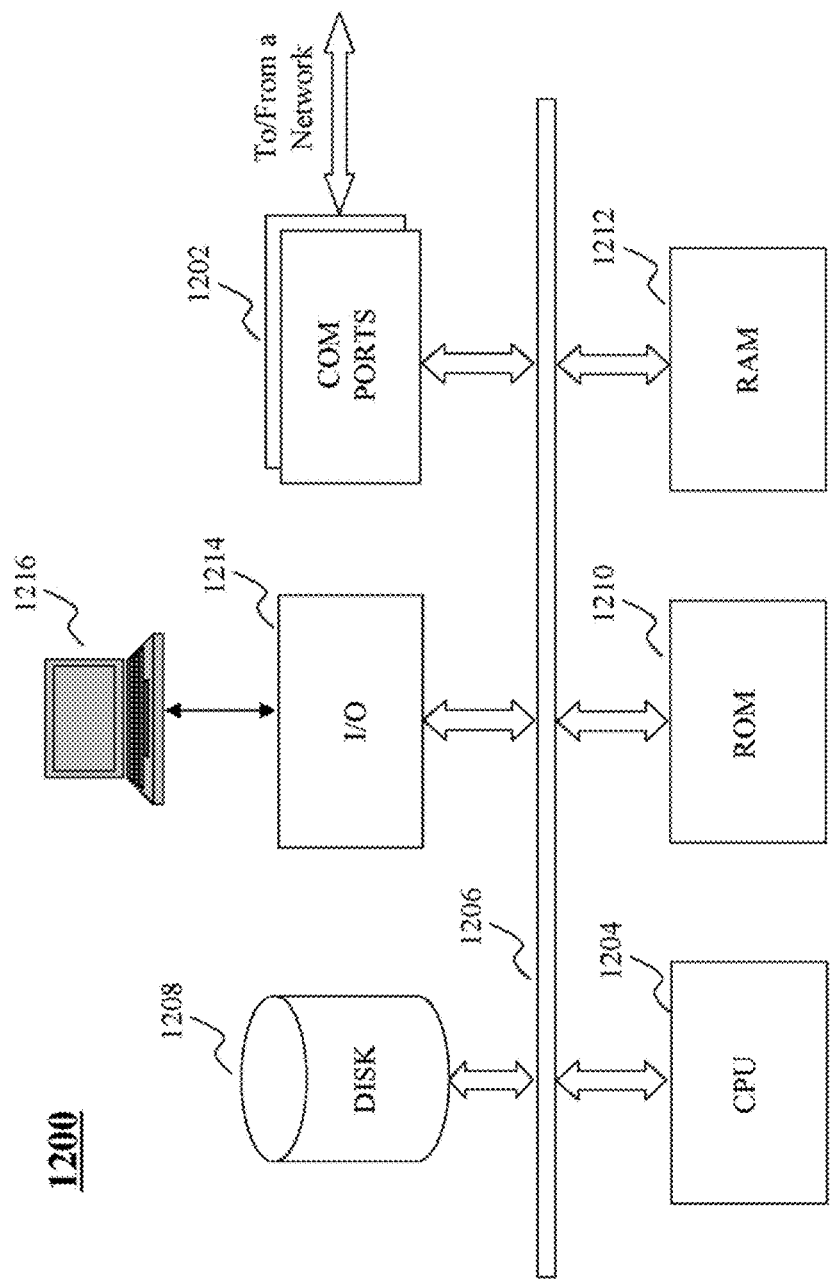
FIG. 12 depicts a general computer architecture on which the present teaching can be implemented.

FIG. 12 depicts a general computer architecture on which the present teaching can be implemented and has a functional block diagram illustration of a computer hardware platform that includes user interface elements. The computer may be a general-purpose computer or a special purpose computer. This computer 1200 can be used to implement any components of the information sharing architecture as described herein. Different components of the system can all be implemented on one or more computers such as computer 1200, via its hardware, software program, firmware, or a combination thereof. Although only one such computer is shown, for convenience, the computer functions relating to information sharing may be implemented in a distributed fashion on a number of similar platforms, to distribute the processing load.

The computer 1200, for example, includes COM ports 1202 connected to and from a network connected thereto to facilitate data communications. The computer 1200 also includes a central processing unit (CPU) 1204, in the form of one or more processors, for executing program instructions. The exemplary computer platform includes an internal communication bus 1206, program storage and data storage of different forms, e.g., disk 1208, read only memory (ROM) 1210, or random access memory (RAM) 1212, for various data files to be processed and/or communicated by the computer, as well as possibly program instructions to be executed by the CPU. The computer 1200 also includes an I/O component 1214, supporting input/output flows between the computer and other components therein such as user interface elements 1216. The computer 1200 may also receive programming and data via network communications.

Hence, aspects of the method of information sharing, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to an medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client, nodes as disclosed herein can be implemented as a firmware, firmware/software combination, firm ware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method implemented on at least one computing machine each having at least one processor, storage, and a communication platform connected to a network for information sharing, comprising:

receiving a first request from a user to access a first piece of information;

retrieving a first representation of the first piece of information as a response to the first request;

allowing the user to access the first piece of information;

receiving a second request from the user to generate a second piece of information based on the first piece of information;

generating the second piece of information based on an input received from the user; and, creating a second representation of the second piece of information;

wherein the second representation and the first representation are marked as associated with each other, thereby allowing access to the second piece of information upon access of the first piece of information;

uploading a file comprising user content;

providing an information sharing controller comprising a base object generator, a supporting object generator, and a synchronization engine, each operably connected with an information database; and, providing a local information sharing client operably connected with the information sharing controller and the information database, and, comprising the base object generator;

wherein the base object generator is configured to convert the file to a directly modifiable base object in a specified format, thereby providing a replacement for a previous version of the directly modifiable base object;

wherein the supporting object generator is configured to generate supporting objects associated with the directly modifiable base object, responsive to user input and activity;

wherein the synchronization engine is configured to convert user input and activity into synchronizing action data, the synchronizing action data suitable for correlating supporting objects with the directly modifiable base object; and, wherein the local information sharing client is configured to correlate the directly modifiable base object and one or more supporting objects, responsive to the synchronizing action data, thereby enabling presentation of the user content.

2. The method of claim 1, wherein the first representation includes a directly modifiable base object of a certain type; and the second representation includes a supporting object and a synchronizing action, wherein the supporting object is a time-based supporting object synchronized with the directly modifiable base object in a time scale such that the time-based supporting object is automatically presented at a specific point in time during presentation of the directly modifiable base object or a non-time-based supporting object synchronized with the directly modifiable base object in a space scale such that the non-time-based supporting object is automatically presented at a specific location on the directly modifiable base object.

3. The method of claim 2, wherein the time-based supporting object includes at least one of an audio, a video, an animation, a mouse movement, a visual effect, and an application; and the non-time-based supporting object includes at least one of a text note, a text comment, a highlight box, a magnifier, a hyperlink, a diagram, an image, and a drawing.

4. The method of claim 1, wherein the step of providing the first representation of the first piece of information comprises converting a file to a directly modifiable base object of a certain type.

5. The method of claim 4, wherein the directly modifiable base object can be accessed by the user via a web browser or an application.

6. The method of claim 4, wherein the file includes at least one of a text, presentation slide, image, music sheet, spreadsheet, video, portable document format (PDF) file, and database file.

7. The method of claim 1, further comprising storing the first piece of information and the second piece of information as separate files.

8. A method implemented on at least one machine each having at least one processor, storage, and a communication platform connected to a network for information sharing, comprising:

receiving a first request from a first user to access a first piece of information;

retrieving a first representation of the first piece of information as a response to the first request;

retrieving a second representation of a second piece of information created by a second user and associated with the first piece of information;

receiving a second request from the first user to create a third piece of information associated with the second piece of information;

generating the third piece of information based on an input from the first user;

generating a third representation of the third piece of information, where the third representation includes an indication of association to the second piece of information;

establishing a relationship between the first user and the second user;

uploading a file comprising user content;

providing an information sharing controller comprising a base object generator, a supporting object generator, and a synchronization engine, each operably connected with an information database; and, providing a local information sharing client operably connected with the information sharing controller and the information database, and, comprising the base object generator;

wherein the base object generator is configured to convert the file to a directly modifiable base object in a specified format, thereby providing a replacement for a previous version of the directly modifiable base object;

wherein the supporting object generator is configured to generate supporting objects associated with the directly modifiable base object, responsive to user input and activity;

wherein the synchronization engine is configured to convert user input and activity into synchronizing action data, the synchronizing action data suitable for correlating supporting objects with the directly modifiable base object; and, wherein the local information sharing client is configured to correlate the directly modifiable base object and one or more supporting objects, responsive to the synchronizing action data, thereby enabling presentation of the user content.

9. The method of claim 8, wherein the first piece of information includes a music sheet;

the second piece of information includes a first audio recorded by the second user; and the third piece of information includes at least one of a comment on the first audio made by the second user and a second audio recorded by the first user.

10. The method of claim 8, wherein the relationship between the first and the second users includes at least one of teach-student, editor-author, attorney-client, doctor-patient, and collaborators relationships.

11. The method of claim 8, further comprising transmitting the third piece of information to the second user.

12. The method of claim 8, further comprising creating a record evidencing the established relationship, wherein the record includes at least one of:
profiles of the first and second users;
the first, second, and third pieces of information;
a time and date when the third piece of information is created by the first user; and
a feedback from the second user with respect to the third piece of information.

13. A method implemented on at least one machine each having at least one processor, storage, and a communication platform connected to a network for information sharing, comprising:
receiving a first request from a first user to access a first piece of information;
retrieving a first representation of the first piece of information in response to the first request;
retrieving a second representation of a second piece of information created by a second user and associated with the first piece of information, where the second representation includes a second solicitation for response to the second piece of information;
receiving a second request from the first user, to respond to the second solicitation;
generating a third piece of information based on an input from the first user in responding to the second piece of information;
generating a third representation for the third piece of information, where the third representation includes an indication of association to the second piece of information;
establishing a service relationship between the first and the second users;
uploading a file comprising user content;
providing an information sharing controller comprising a base object generator, a supporting object generator, and a synchronization engine, each operably connected with an information database; and,
providing a local information sharing client operably connected with the information sharing controller and the information database, and, comprising the base object generator;
wherein the base object generator is configured to convert the file to a directly modifiable base object in a specified format, thereby providing a replacement for a previous version of the directly modifiable base object;
wherein the supporting object generator is configured to generate supporting objects associated with the directly modifiable base object, responsive to user input and activity;
wherein the synchronization engine is configured to convert user input and activity into synchronizing action data, the synchronizing action data suitable for correlating supporting objects with the base object; and,
wherein the local information sharing client is configured to correlate the directly modifiable base object and one or more supporting objects, responsive to the synchronizing action data, thereby enabling presentation of the user content.

14. The method of claim 13, wherein
the first piece of information includes a music sheet;
the second piece of information includes a first audio created by the second user and a solicitation for a comment on the first audio; and
the third piece of information includes at least one of a comment on the first audio made by the second user and a second audio recorded by the first user.

15. The method of claim 13, wherein the service relationship between the first and the second users includes at least one of teach-student, editor-author, attorney-client, and doctor-patient relationships.

16. The method of claim 13, further comprising transmitting the third piece of information to the second user as the response to the second solicitation.

17. The method of claim 13, further comprising creating a record for the service relationship, wherein
the record includes a service fee involved in the service relationship; and
the service fee increments based on the creation of the third piece of information.

18. A method implemented on at least one machine each having at least one processor, storage, and a communication platform connected to a network for information sharing, comprising:
receiving a first request from a first user to access a first piece of information created by a second user;
retrieving a first representation of the first piece of information as a response to the first request, where the first representation includes a solicitation from the second user for additional information based on the first piece of information;
generating a second piece of information based on an input from the first user in response to the solicitation;
generating a second representation for the second piece of information, where the second representation includes an indication of association with the first piece of information;
generating a third piece of information based on the first and second pieces of information;
providing the third piece of information to a third user;
establishing relationships between the third and first users and between the third and second users;
creating an account record corresponding to the established relationships;
uploading a file comprising user content;
providing an information sharing controller comprising a base object generator, a supporting object generator, and a synchronization engine, each operably connected with an information database; and,
providing a local information sharing client operably connected with the information sharing controller and the information database, and, comprising the base object generator;
wherein the base object generator is configured to convert the file to a directly modifiable base object in a specified format, thereby providing a replacement for a previous version of the directly modifiable base object;
wherein the supporting object generator is configured to generate supporting objects associated with the directly modifiable base object, responsive to user input and activity;
wherein the synchronization engine is configured to convert user input and activity into synchronizing action data, the synchronizing action data suitable for correlating supporting objects with the directly modifiable base object; and,
wherein the local information sharing client is configured to correlate the directly modifiable base object and one or more supporting objects, responsive to the synchronizing action data, thereby enabling presentation of the user content.

19. A method implemented on at least one computing machine each having at least one processor, storage, and a communication platform connected to a network for information sharing, comprising:

receiving and uploading a data file comprising user content;

converting said data file into a directly modifiable base object optimized for presentation on a screen;

receiving one or more pieces of information related to said directly modifiable base object and storing said pieces of information as one or more supporting objects associated with said directly modifiable base object;

receiving one or more synchronizing actions that relate said one or more supporting objects to specific points in time and/or specific locations on said directly modifiable base object;

storing said directly modifiable base object, said one or more supporting objects, and said one or more synchronizing actions in an information database;

dynamically displaying a presentation on one or more devices by:

delivering said directly modifiable base object, said one or more supporting objects, and said one or more synchronizing actions from said information database to said one or more devices over a network connection;

presenting said directly modifiable base object on screen at said one or more devices;

automatically presenting said one or more supporting objects on said one or more devices at specific points in time and/or specific locations on said directly modifiable base object during display of said presentation according to said one or more synchronizing actions, wherein said information database is configured to receive edits to said directly modifiable base object and said one or more supporting objects and new data comprising new supporting objects and associated synchronizing actions from said one or more devices, such that the display of said presentation is updated for said one or more devices real time based on said edits and said new data;

providing an information sharing controller comprising a base object generator, a supporting object generator, and a synchronization engine, each operably connected with the information database; and, providing a local information sharing client operably connected with the information sharing controller and the information database, and, comprising the base object generator;

wherein the base object generator is configured to convert the data file to the directly modifiable base object in a specified format, thereby providing a replacement for a previous version of the directly modifiable base object;

wherein the supporting object generator is configured to generate supporting objects associated with the directly modifiable base object, responsive to user input and activity;

wherein the synchronization engine is configured to convert user input and activity into synchronizing action data, the synchronizing action data suitable for correlating supporting objects with the directly modifiable base object; and, wherein the local information sharing client is configured to correlate the directly modifiable base object and one or more supporting objects, responsive to the synchronizing action data, thereby enabling presentation of the user content.

20. The method of claim 19, wherein said directly modifiable base object is converted from at least one of: a text document, presentation slide, image, music sheet, spreadsheet, video, portable document format (PDF) file, and database file.

21. The method of claim 19, wherein at least one of said one or more supporting objects is associated with a time based synchronizing action and, during display of said presentation, the automatic presentation of said at least one of said one or more supporting objects is synchronized with presentation of said directly modifiable base object in a time scale.

22. The method of claim 21, wherein said at least one of said one or more supporting objects is at least one of: an audio recording, a video, an animation, a mouse movement, a visual effect, and an application.

23. The method of claim 19, wherein at least one of said one or more supporting objects is associated with a non-time-based synchronizing action and, during display of said presentation, the automatic presentation of said at least one of said one or more supporting objects is coordinated with presentation of said directly modifiable base object in a space scale.

24. The method of claim 23, wherein said at least one of said one or more supporting objects is at least one of: a text note, a text comment, a highlight box, a magnifier, a hyperlink, a diagram, an image, and a drawing.

25. The method of claim 19, wherein said directly modifiable base object is converted from a music sheet.

26. The method of claim 25, wherein one of said one or more supporting objects is an audio recording related to said music sheet.

27. The method of claim 26, wherein another one of said one or more supporting objects is a comment on said audio recording.

28. The method of claim 26, wherein another one of said one or more supporting objects is a second audio recording.

29. The method of claim 19, wherein users of two or more of said one or more devices are in a relationship, said relationship being at least one of: a teacher-student relationship, an editor-author relationship, an attorney-client relationship, a doctor-patient relationship, and a collaboration relationship.

30. The method of claim 29, further comprising incrementing a service fee amount when a particular user in said relationship creates a new supporting object for one or more other users in said relationship.

31. The method of claim 19, wherein presentation of said directly modifiable base object and said one or more supporting objects to said one or more users on said one or more devices is accessed through a web browser or an application on said one or more devices.

32. The method of claim 19, further comprising saving previous versions of said directly modifiable base object and any of said one or more supporting objects in said information database when said directly modifiable base object or any of said one or more supporting objects are edited.

33. The method of claim 19, further comprising preloading at least some of said directly modifiable base object, said one or more supporting objects, and/or said one or more synchronizing actions in local storage in said one or more devices prior to beginning display of said presentation, such that said one or more devices can retrieve local copies of said directly modifiable base object, said one or more supporting objects, and said one or more synchronizing actions during dynamic display of said presentation.

34. The method of claim 19, wherein said new supporting objects added to said information database from said one or more devices is associated with one or more previously existing supporting objects, such that the one or more synchronizing actions associated with said new supporting objects are keyed off the synchronizing actions associated with said one or more previously existing supporting objects during future displays of said presentation.

35. The method of claim 34, wherein at least one of said new supporting objects is an audio recording.

* * * * *